United States Patent [19]
Kamel et al.

[11] Patent Number: 5,937,037
[45] Date of Patent: Aug. 10, 1999

[54] COMMUNICATIONS SYSTEM FOR DELIVERING PROMOTIONAL MESSAGES

[75] Inventors: Alexandre P. Kamel, Annapolis, Md.; Akram Y. Abdelrahman, Woodridge, N.J.

[73] Assignee: BroadPoint Communications, Inc., Landover, Md.

[21] Appl. No.: 09/015,063

[22] Filed: Jan. 28, 1998

[51] Int. Cl.⁶ .................................................. H04M 1/64
[52] U.S. Cl. ..................................... 379/88.19; 379/88.22
[58] Field of Search .................... 379/67.1, 83, 88.09, 379/88.19, 88.2, 88.21, 88.22, 88.25, 142

[56] References Cited

U.S. PATENT DOCUMENTS

| | | |
|---|---|---|
| Re. 34,380 | 9/1993 | Sleevi . |
| 4,510,349 | 4/1985 | Segre-Amar . |
| 4,811,382 | 3/1989 | Sleevi . |
| 4,850,007 | 7/1989 | Marino et al. ......................... 379/67.1 |
| 4,943,995 | 7/1990 | Daudelin et al. ..................... 379/88.03 |
| 4,996,705 | 2/1991 | Entenmann et al. ................. 379/88.01 |
| 5,150,399 | 9/1992 | Yasuda .................................. 379/88.26 |
| 5,163,087 | 11/1992 | Kaplan . |
| 5,187,735 | 2/1993 | Herrero Garcia et al. .......... 379/88.17 |
| 5,222,120 | 6/1993 | McLeod et al. ...................... 379/88.24 |
| 5,333,186 | 7/1994 | Gupta ...................................... 379/201 |
| 5,355,403 | 10/1994 | Richardson, Jr. et al. .......... 379/88.26 |
| 5,357,564 | 10/1994 | Gupta et al. ............................ 379/188 |
| 5,438,615 | 8/1995 | Moen ...................................... 379/144 |
| 5,448,625 | 9/1995 | Lederman .............................. 379/67.1 |
| 5,452,350 | 9/1995 | Reynolds et al. ...................... 379/220 |
| 5,473,681 | 12/1995 | Partridge, III .......................... 379/229 |
| 5,513,254 | 4/1996 | Markowitz ........................ 379/100.17 |
| 5,515,424 | 5/1996 | Kenney ................................. 379/93.22 |
| 5,524,142 | 6/1996 | Lewis et al. ............................ 379/112 |
| 5,539,809 | 7/1996 | Mayer et al. ......................... 379/88.16 |
| 5,572,583 | 11/1996 | Wheeler, Jr. et al. ................. 379/207 |
| 5,583,918 | 12/1996 | Nakagawa ............................ 379/91.01 |
| 5,583,920 | 12/1996 | Wheeler, Jr. ......................... 379/88.01 |
| 5,615,251 | 3/1997 | Hogan et al. ........................... 379/112 |
| 5,623,536 | 4/1997 | Solomon et al. ..................... 379/88.18 |
| 5,652,784 | 7/1997 | Blen et al. .............................. 379/67.1 |

FOREIGN PATENT DOCUMENTS

| | | |
|---|---|---|
| 57-87661 | 6/1982 | Japan . |
| 58-173951 | 10/1983 | Japan . |

OTHER PUBLICATIONS

Gerry Blackwell, "Dial–a–Quote: first Canadian commercial audiotex service", Computing Canada, pp. 21–22, Oct. 3, 1985.

Alan Field, "The Yellow Page Operator", Forbes, Jul. 15, 1985, pp. 106–107.

Paul D. Thomas, "Don't Hang Up", Venture Strategies, Apr. 1986, p. 100.

Steve Blount et al., "Talking Yellow Pages", Target Marketing, Oct. 1987, pp. 40–41.

Patricia Stroad et al., "Yellow Pages that 'talk' have major hangups" Advertising Age, V. 61, No. 42, Oct. 8, 1990, p. 73.

*Primary Examiner*—Scott Weaver
*Attorney, Agent, or Firm*—Jones & Volentine, LLP

[57] ABSTRACT

A telecommunications system is for delivering promotional messages to subscribed calling parties. In one configuration, the system includes an association processor for comparing preset targeting criteria of each promotional message with profile data of each subscribed calling party to obtain data associating each of the promotional messages with at least one subscribed calling party. In addition, a message queue having a plurality of electronic queues is provided, each of the electronic queues assigned to at least one subscribed calling party and storing the data associating each of the promotional messages with at least one subscribed calling party. A call processor operates off-line of the association processor and accesses an electronic queue assigned to a calling party and delivers to the calling party a promotional message according the data contained in the accessed electronic queue. In a preferred configuration, multiple queue types are provided having differing targeting precisions.

59 Claims, 21 Drawing Sheets

COMMUNICATIONS SYSTEM FOR DELIVERING PROMOTIONAL MESSAGES

BACKGROUND OF THE INVENTION

1. Field of the Invention

The present invention generally relates to telephony and data communications networks, and in particular, the present invention relates to a system which flexibly and efficiently delivers targeted promotional messages to end-user subscribers, preferably based on profiles, preferences and/or interests. Herein, promotional messages include advertisements, public service announcements, surveys, and the like, delivered in audio, video and/or graphic formats.

2. Description of the Related Art

End-users (telephone and computer network subscribers) have historically paid network access and/or usage-based fees to carriers in exchange for the ability to communicate with other end-users. More recently, however, systems have been proposed which enable end-users to receive free and/or subsidized telephone-based communications services in exchange for listening to promotional messages provided by third party sponsors. These systems, however, lack the sophistication and functionality needed for broad cost-effective application in large complex markets. Morever, such systems, having been designed to carry out the message selection (targeting) process at the front end of, or during, each call, may suffer from reduced performance (delays caused by processings at the time of the call) or increased costs (due to the need for additional in-house processing requirements). Such limitations are amplified under wide scale deployment.

In order to reduce processing requirements at the front-end of, or during, each call, one or more systems classify subscribers according to common (or shared) characteristics. When targeting messages, all subscribers within a given class are treated the same, i.e., all subscribers within a given category will be targeted as a group. While this approach does, in fact, simplify and streamline the processing requirements, it also inhibits the ability of such systems to resolve individual subscribers due to the aggregation of subscribers into common classifications. It also imposes added complexity as the number of targeting parameters increases, since each subscriber may belong to more than one classification or category. The net effect is to limit the precision with which a sponsoring party may target messages with little, if any, gain in process efficiency. This is a severe limitation in existing system designs given that virtually all consumer oriented industries are trending from market or segment-focused marketing and advertising toward customer or individual-focused marketing and advertising. A drawback of existing systems thus resides in the inability to resolve individual subscribers.

SUMMARY OF THE INVENTION

It is an object of the present invention to provide a telephony network which delivers highly targeted advertisements and promotional messages to groups and/or individuals via switched telephone networks and telephony devices, including analog or digital telephones, screen-phones and video-phones.

According to one aspect of the invention, a telecommunications system for delivering promotional messages to subscribed calling parties is provided and includes an association processor for comparing preset targeting criteria of each promotional message with profile data of each subscribed calling party to obtain data associating each of the promotional messages with at least one subscribed calling party; a message queue having a plurality of electronic queues, each of said electronic queues assigned to at least one subscribed calling party and storing the data associating each of the promotional messages with at least one subscribed calling party; and a call processor for accessing an electronic queue assigned to a calling party and delivering to the calling party a promotional message according to the data contained in the accessed electronic queue.

According to another aspect of the present invention, a telecommunications system for delivering promotional messages to calling parties is provided and includes a plurality of electronic queues which are respectively identifiable by unique queue identification numbers corresponding to unique calling party personal identification numbers, each of said electronic queues for storing data indicative of at least one promotional message; and an interface unit which receives a personal identification number from a calling party and retrieves and outputs to the calling party a promotional message indicated by the data contained in a one of said plurality of electronic queues indicated by queue identification number corresponding to the received personal identification number.

According to still another aspect of the present invention, a telecommunications system for delivering promotional messages to calling parties is provided and includes a local message bank having a plurality of electronic queues for storing data indicative of promotional messages therein and identifiable by queue identification numbers, each of the queue identification numbers corresponding at least one of calling party personal identification numbers and calling parting origination numbers, said plurality of electronic queues including multiple types of queues having differing message targeting precision levels; an interface unit which receives at least one of a personal identification number and an origination number from a calling party and retrieves and outputs to the calling party a promotional message indicated by the data contained in a one of said plurality of electronic queues having a highest targeting precision level as identified by queue identification number corresponding to the received at least one of the personal identification number and the origination number.

According to another aspect of the present invention, a telecommunications system for delivering promotional messages to calling and called parties is provided and includes a local message bank having a plurality of electronic queues for storing data indicative of promotional messages therein and identifiable by calling party personal identification numbers; an interface unit which receives a personal identification number from a calling party and retrieves and outputs to the calling party a promotional message indicated by the data contained in a one of said plurality of electronic queues identified by the received personal identification number; and a central control facility for associating the promotional messages with subscribed calling parties off-line from the local message bank, and for downloading data indicative of the associations to the local message bank for storage of corresponding data in designated ones of said electronic queues.

According to still another aspect of the present invention, a method for delivering promotional messages to subscribed calling parties is provided and includes comparing preset targeting criteria of each promotional message with profile data of each subscribed calling party to obtain data associating each of the promotional messages with at least one subscribed calling party; storing the data associating each of the promotional messages with at least one subscribed calling party in a message queue having a plurality of electronic queues, each of said electronic queues assigned to at least one subscribed calling party; and accessing an electronic queue assigned to a calling party and delivering to the calling party a promotional message according to the data contained in the accessed electronic queue.

According to another aspect of the present invention, a method for delivering promotional messages to calling and called parties in a telecommunications system is provided and includes storing data indicative of promotional messages in a plurality of electronic queues which are addressed by queue identification numbers, each of the queue identification numbers corresponding to at least on calling party identification numbers; processing a call by receiving an identification number of a calling party and retrieving and outputting to the calling party a promotional message indicated by the data contained in a one of said plurality of electronic queues identified by the queue identification number corresponding to the received identification number; and assembling and downloading the data indicative of promotional messages for storage in designated ones of said electronic queues; wherein said assembling and downloading of the promotional message are carried out off-line of said processing of the call.

According to yet another aspect of the present invention, a method for delivering promotional messages to calling and called parties in a telecommunications system is provided and includes assembling and storing message data modules at a control module, each of said message data modules including at least a promotional message, at least one personal identification number associated with the promotional message, and delivery parameters associated with the promotional message; downloading the message data modules to a distribution module; transferring from the distribution module at least the promotional message of each message data module to at least one of plural electronic queues addressed by the personal identification number associated with the promotional message; and processing a call by receiving a personal identification number from a calling party and retrieving and outputting to the calling and called parties a promotional message contained in a one of said plural electronic queues identified by the received personal identification number.

BRIEF DESCRIPTION OF THE DRAWINGS

The above and other objects and advantages of the present invention will become readily apparent to those skilled in the art from the detailed description that follows, with reference to the accompanying drawings, in which.

DETAILED DESCRIPTION OF THE PREFERRED EMBODIMENTS

The network configuration of the preferred embodiment delivers highly targeted advertisements and promotional messages to groups and/or individuals via switched telephone networks and telephony devices including analog or digital telephones, screen-phones and video-phones. The system enables third parties to sponsor telephone-based communications between end-users (i.e., "sponsored telephone communications").

Figure 1:
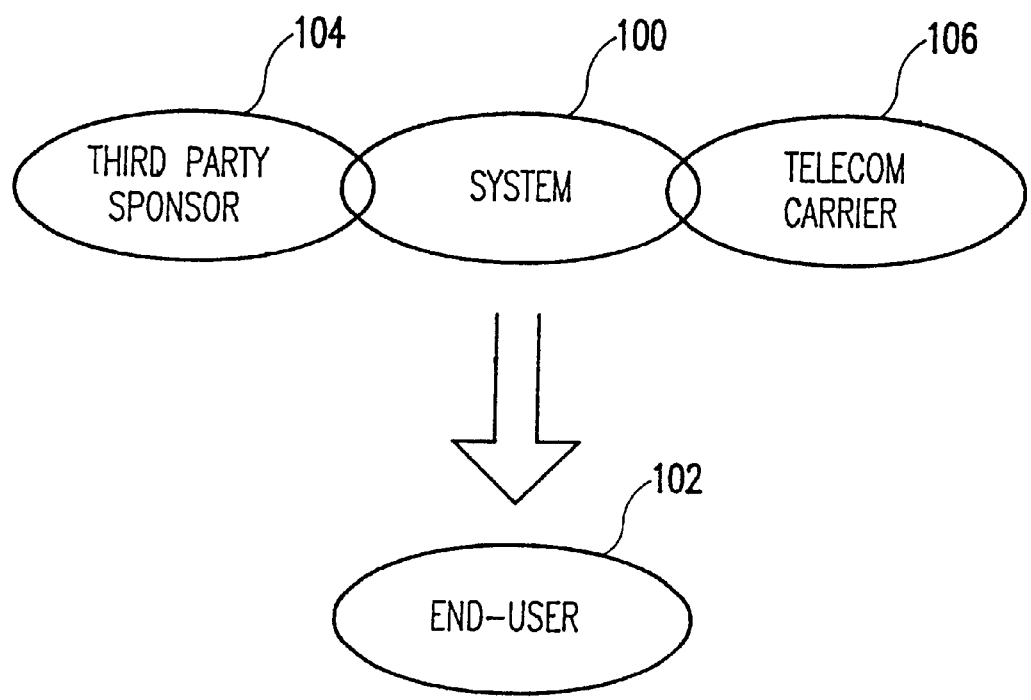
FIG. 1 is a conceptional diagram of the three-way exchange between communications customers, third party sponsors and telcom carriers using the system of the present invention.

As illustrated in FIG. 1, the system 100 of the invention facilitates a three-way exchange between communications customers 102 ("end-users"), third party sponsors 104 (e.g., advertisers, polling and survey agencies) and telecommunications service providers 106 ("carriers").

The system of the present invention enables end-users to receive free and/or subsidized telephone-based communications services in exchange for listening to and/or interacting with messages (e.g., advertisements and/or surveys) provided by third party sponsors. The system enables advertisers and other organizations to deliver these "sponsor" messages to and/or obtain feedback from target groups and individuals via traditional telephone networks in exchange for message distribution fees (i.e., analogous to fees paid to obtain space and/or time on traditional advertising media like print, radio and television). The carriers would receive payment for providing the communications capacity and connectivity for the delivery of sponsored messages and to support communications between end-users.

As will become apparent, the system uses individual message boxes as a metaphor for the underlying system design. Conceptually, this is analogous to personal voice mail boxes in which relevant advertising messages are distributed for subsequent retrieval when a subscriber accesses the system. In practice, the system is configured to associate messages with particular subscribers (i.e., place messages or message ID's into individual messages boxes) based on specified targeting criteria. Because message ID's are essentially pointers to actual stored messages, a given message box may contain various message ID's indicating a variety of messages and message types. A message ID may, for example, indicate (or point to) an audio message stored in an audio message file, a video message stored in a video message file or even a still image message stored in a graphics file.

Each subscriber has a unique individual message box or queue representing a one-to-one association of messages with individuals. Additionally, the system has several, more generalized queue-types including usage-based, category, geographic and general queues (these will be described subsequently). These more generalized (many-to-one) queues are effectively treated the same as the individual queues. Each is identified by a queue identification number (QIN), analogous to the PIN used to identify a subscriber's individual message box. Each is characterized by a set of parameters analogous to the personal profile used to characterized individuals. In the case of usage queues, these parameters are defined in terms of subscriber usage, e.g., the number of times a subscriber passively accesses the system or a number of times a subscriber interactively accesses the system. Category queue parameters are defined by the same dimensions used to characterize subscriber profiles, e.g., there may be a category queue representing all malls between 25 and 54. Geographic queues are characterized by physical location of the subscriber. And finally, general queues simply represent the absence of any profile, usage or geographic characteristics.

Conceptually, each generalized queue is treated as a single subscriber having appropriate profile characteristics. The process of creating a new generalized queue is analogous to that of subscribing a new customer. However, given that generalized queues will serve multiple users, they are generally much larger in terms of the number of messages or message ID's stored therein.

Figure 2:
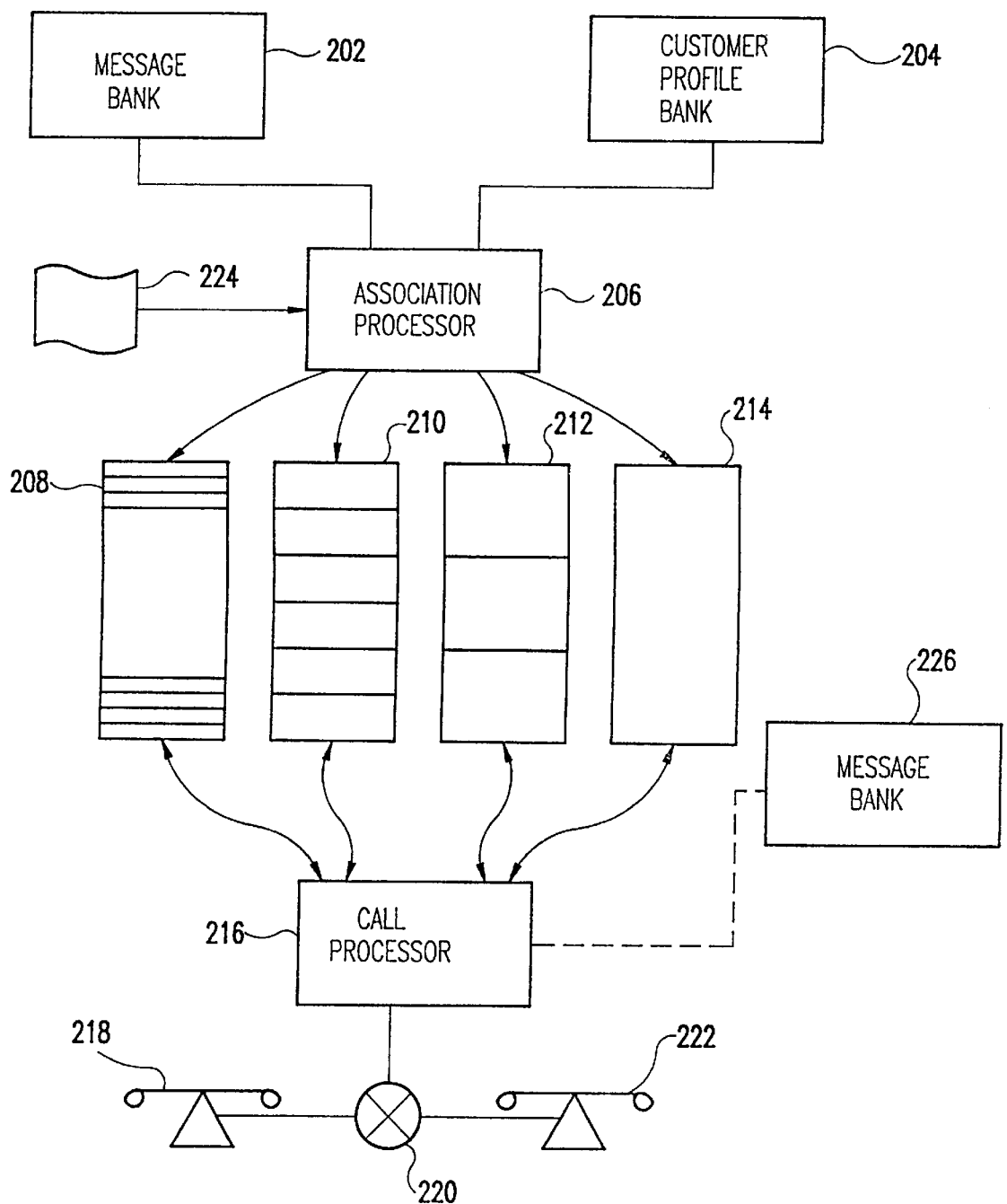
FIG. 2 shows a top level configuration of the system of the preferred embodiment of the present invention.

FIG. 2 shows a top level configuration of the system according to one embodiment of the present invention. A message bank 202 contains promotional messages to be delivered to subscribed calling parties and/or called parties. Each message includes a set of target parameters defining the preferred attributes (i.e., male or female, age range, income level, etc.) of the person for which the message is intended. In addition, each message is designated as an individual message, a category message, a geographic message or a general message, as described below. A customer profile bank 204 contains data indicative of the profile of each subscribed calling party. Such data might include gender, age, occupation, education, family status, income, geographic and other information. Each customer is assigned and identified by a unique personal identification number (PIN).

Reference numeral 206 denotes an association processor which associates a message contained in the message bank 202 with one or more customer PINs by matching targeting parameters 224 with corresponding profile data contained in the customer profile bank 204. For example, a given message might have targeting parameters dictating that the message be distributed to persons who are female, in the 18–35 age range, and having at least a high school education. The association processor 206 associates the message with all or a subset of the PINs of customers falling with these parameters.

The associations between customers and messages are stored in one or more message queues 208, 210, 212 and 214. Queues 208 are individual message queues which are uniquely identified and associated with individual customer PINs. In addition to individual "message boxes" (one-to-one associations), the architecture employs several additional box types conceptually arranged (with the individual message boxes) in decreasing order of targeting precision (increasing generalization): (1) individual message queues 208, (2) category message queues 210, (3) geographic message queues 212, and (4) general message queues 214. These additional message queues are effectively sub-classes of the association class representing many-to-one associations of messages with individuals.

That is, the individual queues 208 or message boxes are provided, one for each subscribed customer, and uniquely identified by a customer PIN. In practice, the PIN may be translated to a unique queue identification number identifying a respective queue. The individual message queues 208 store all messages (or message pointers) that have been targeted to the customer profile associated with the corresponding PIN. This represents a "one-to-one" correspondence between message queues and individuals. The category queues 210 are identified by queue identification numbers QINs (which may be keyed by data resident in the individual queues identified by the customer PINs) and contain messages (or message pointers) targeted at customers which share one or more targeting parameters/ characteristics (i.e., queues which hold messages for defined categories of customers). For example, there might be a queue for all females between the ages of 22 and 35. These queues 210 can be defined dynamically (i.e., added, changed, removed) as campaign requirements dictate, and represent a "one-to-many" relationship between messages and end-users. The geographic queues 212 are identified by queue identification numbers QINs keyed by the ANI (Automatic Number Identifier), or telephone number, of the individual end-user who is placing a call (or similar means of originating station identification). All messages (or message pointers) are stored that have been targeted for delivery within a given geographic area rather than to specific individual PINs and/or categorized PINs. Again, these queues represent a "one-to-many" relationship between messages and end-users. Finally, the general queue 214 is provided for messages which are not specifically targeted to individuals, categories of individuals or specified geographic areas (i.e., those intended for broad-based distribution to general audiences). These, again, represent a "one-to-many" relationship between queues and end-users.

It is noted that all queues, whether individual, category, geographic, general, or other, are identified by a queue identification number QIN. In the case of individual subscriber queues, each unique PIN is the same as or is translated to a corresponding unique QIN.

Figure 3A:
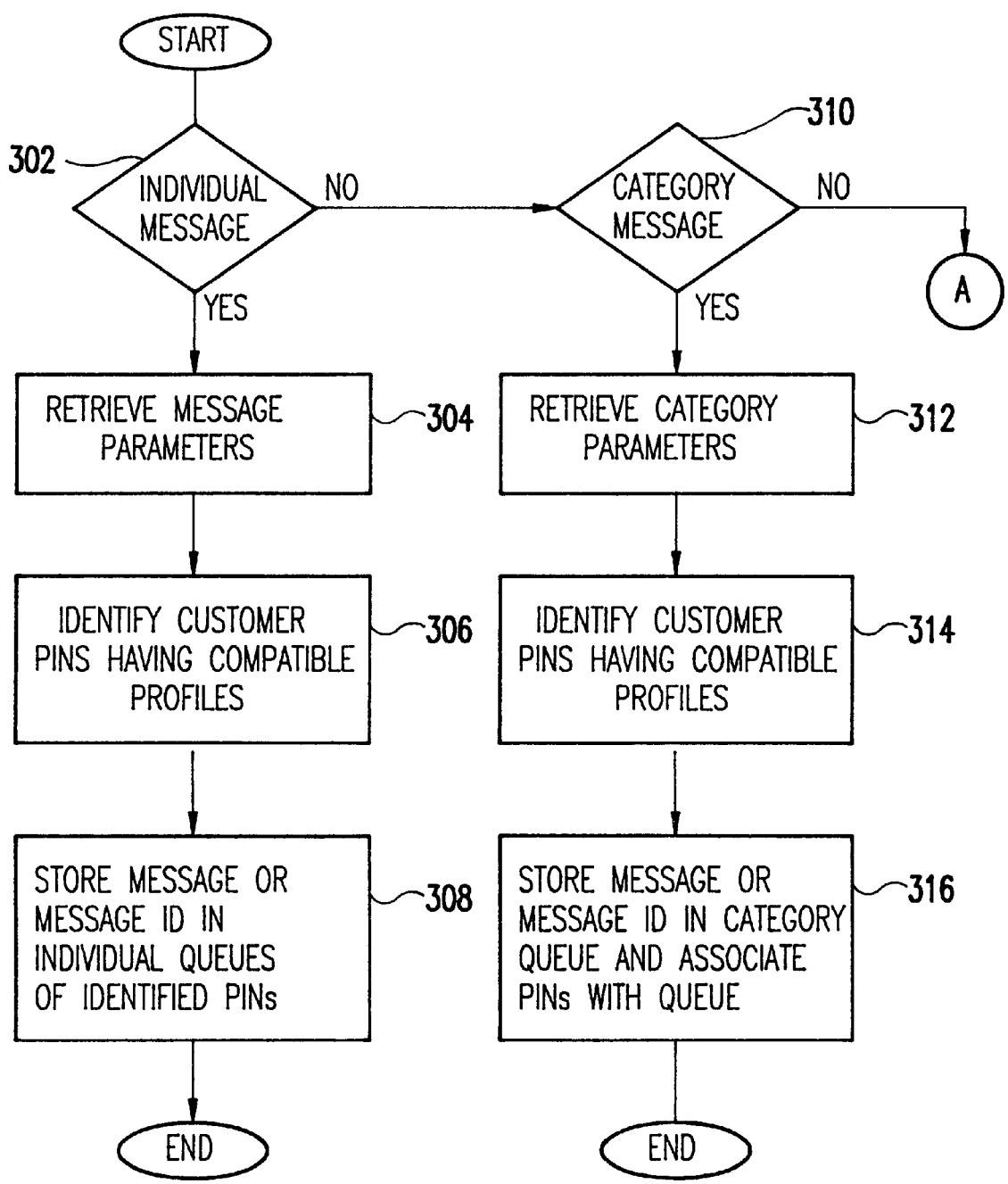
FIGS. 3(a)–3(b) constitute a flow chart for explaining the storage of message associations in electronic queues.
Figure 3B:
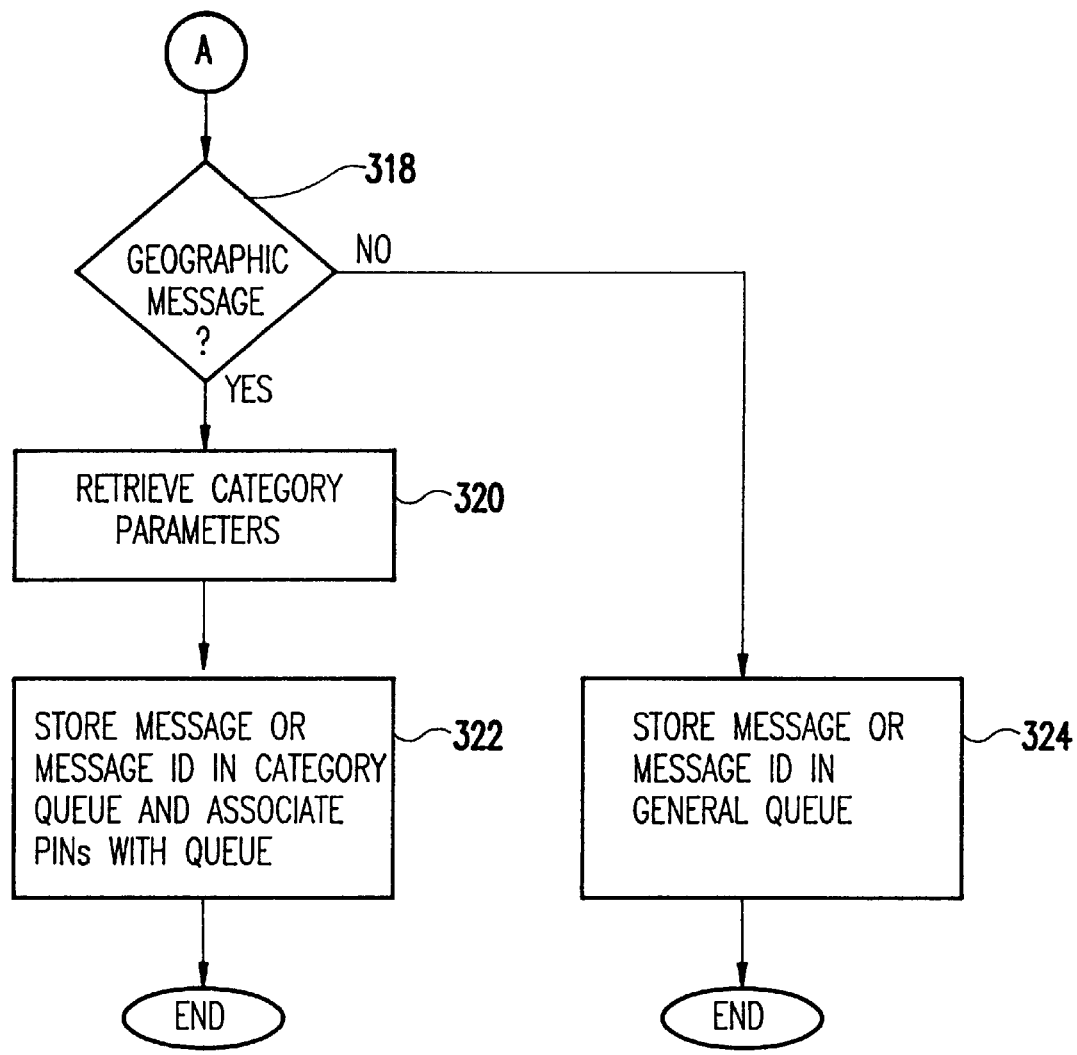

Attention is directed to FIGS. 3(a) and 3(b) showing an operational flow of the association processor 206 according one embodiment of the invention. In the case where a message is intended for distribution to targeted individuals (YES at step 302), the message parameters associated with the message are retrieved (step 304) and all or a given number of customer PINs of compatible profiles are identified (step 306). Either the message itself, or more preferably a message pointer (i.e., a message ID for the message), is stored in each of the individual queues of the identified customer PINs (step 308). In the case where a message is intended for distribution to targeted predefined categories of customers (NO at step 302 and YES at step 310), the message parameters associated with the message are retrieved (step 312) and all or a given number of customer PINs of compatible profiles are identified (step 314). Either the message itself, or more preferably a message pointer (i.e., a message ID for the message), is stored in the appropriate category queue, and a pointer is placed in the individual queues of the identified customer PINs, with the resident pointer identifying the queue identification number QIN of the appropriate category queue (step 316). In the case where the message is intended for distribution to individuals of a particular geographic area (NO at step 310 and YES at step 318), the geographic parameters associated with the message are retrieved (step 320), and the message or message pointer is stored in the geographic queue identified by the retrieved parameters (step 322). This is carried out, for example, using automatic number identification ANI techniques. Finally, in the case where the message is intended for general distribution (NO at step 318), the message or message pointer is stored in the general queue (324).

Returning to FIG. 2, it is noted that either a copy of the message or a message pointer may be stored in the queues. In the case of message pointers, the call processor (explained below) would retrieve messages from a message bank 226 as they are designated by the message pointers contained in the selected queues. For convenience, the description herein sometimes refers to the retrieval and playing of messages stored in the message queues. However, it is understood that such also includes the storage of message pointers for addressing and accessing message physically stored in a message bank. In other words, the electronic queues contain data indicative of messages, whether they be message pointers or the messages themselves.

It is also noted that the one or more of the generalized ("many-to-one") queues may be wholly or partly implemented using the individualized queues. By way of example, assume a common target audience to be males between ages 25 and 40. A list of customer PINs meeting this criteria may be formulated in advance to create a "standard" category or geographic profile.

That is, in designing a message, the advertiser may elect to customize target audience parameters or use standard target audiences (i.e., predefined categories), customize geographic parameters or use standard geographies, and so on. The standard categories and geographies can be implemented by dedicated queues as described above. Alternatively, lists of customer PINs associated with the standard categories or geographies my be generated, and the messages may then be deposited in the individual queues of the identified customers. Since the messages can be reproduced in order of priority (i.e., the messages can be presorted within each queue using coding logic), this alternative technique effectively achieves the same result as the use of dedicated generalized queues which toggle from one distinct queue to the next.

Figure 4A:
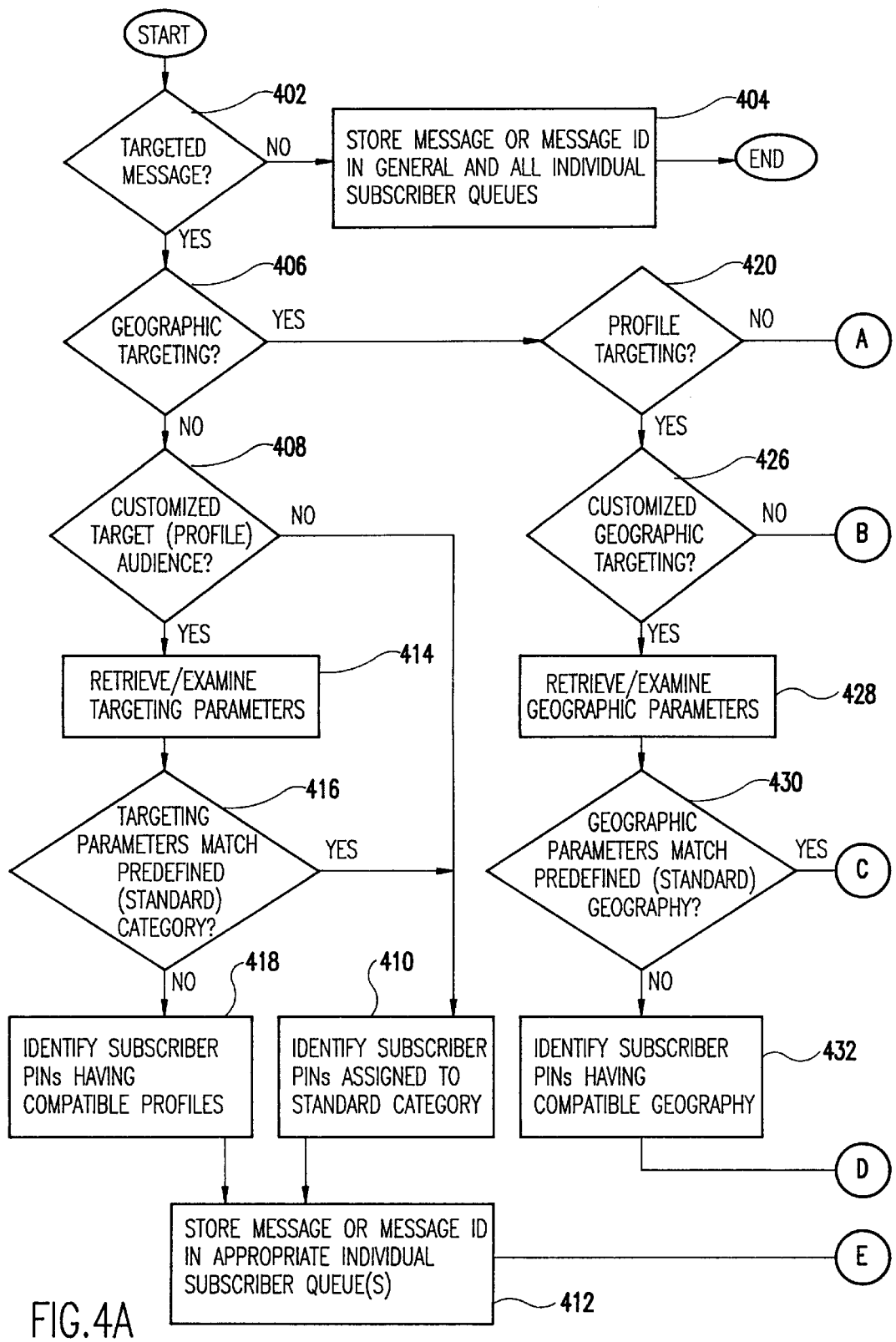
FIG. 4 illustrates another example of the storage of message associations in the electronic queues.
Figure 4B:
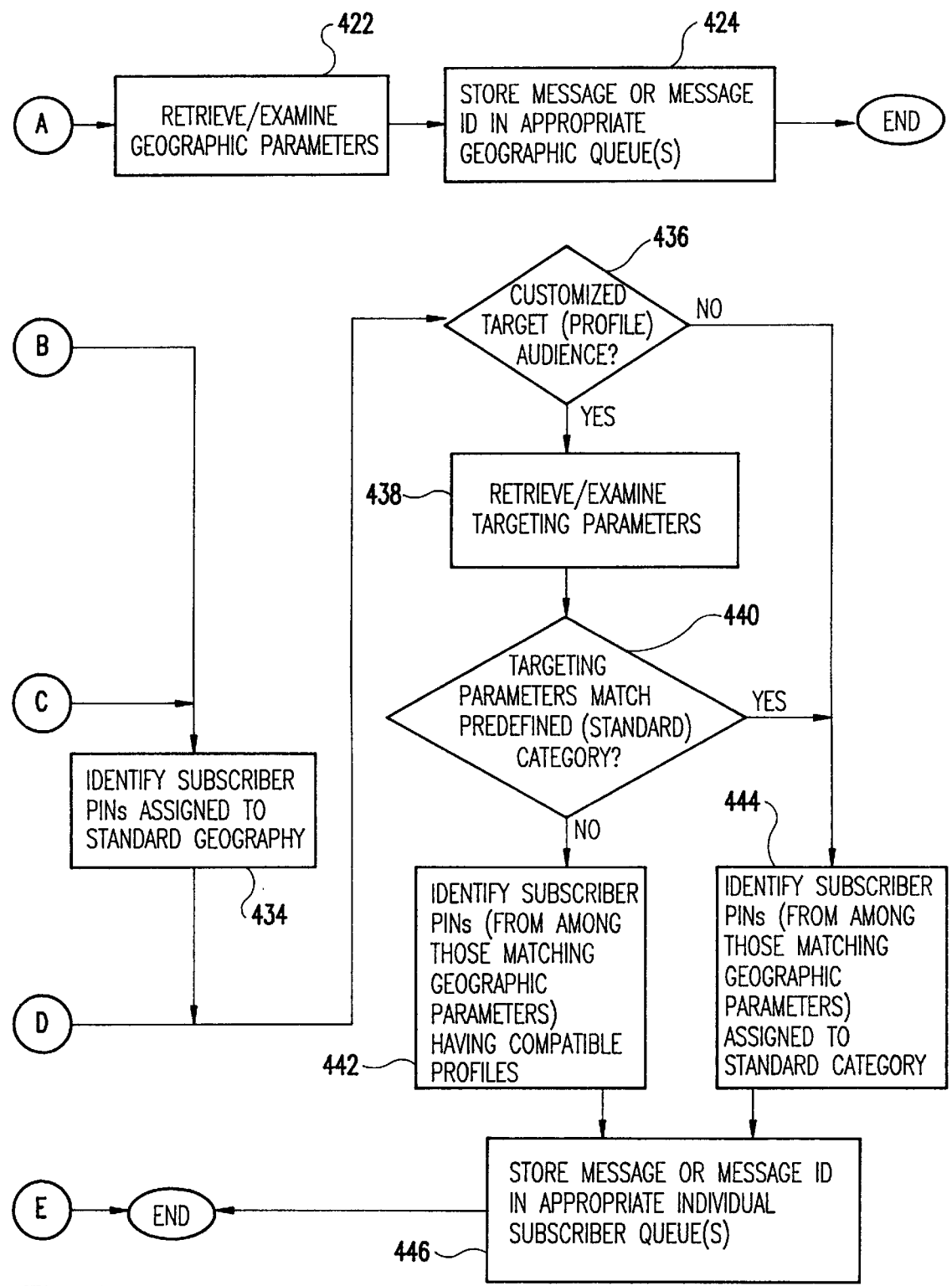

FIG. 4 shows an example of application of this technique. In the case of a non-targeted message (NO at step 402), the message (i.e., either the message itself or a message ID) is stored at step 404 in the generalized queue or in all of the individual queues. In the case of a targeted message which lacks geographic targeting (YES at step 402 and NO at step 406), the message is either intended for a customized target profile-based audience or a standard category audience. In the case of a standard category (NO at step 408), the subscriber PINs of the category audience are identified (usually in a list of PINs is prepared advance) at step 410, and the message or message ID is stored in the appropriate individual subscriber queues as identified by the PINs (step 412).

In the case where the advertiser as selected to customize the target audience (YES at step 408), the targeting parameters (e.g., age, gender, income level, etc.) are retrieved and examined at step 414. While the advertiser may have intended to customize parameters, it is possible that the selected parameters will match a predefined standard category of parameters. In this case (YES at step 416), the subscriber PINs of the category audience are identified (usually a list of PINs is prepared in advance) at step 410, and the message or message ID is stored in the appropriate individual subscriber queues as identified by the PINs (step 412). Otherwise (NO at step 416), the subscriber PINs of subscribers having matching profiles are identified at step 418, and the message or message ID is stored in the appropriate individual subscriber queues as identified by the PINs (step 412).

In the case geographic-only parameters, i.e., geographic targeting in the absence of customer profile targeting (YES at step 406 and NO at step 422), the geographic parameters are retrieved and examined, and the message or message ID is stored in the appropriate geographic queue (step 424). In this example, for ease of explanation, the geographic-only parameters are limited to standard-type geographics for which geographic queues have been provided in advance. A more complex arrangement would allow geographic-only parameters to be customized by the advertiser, with messages being stored in the individual queues according to the customized geographic-only parameters.

In the case where the advertiser combines standard (i.e., predefined) geographic parameters with subscriber profile parameters (YES at step 420 and NO at step 426), the subscriber PINs of the standard geographic are identified (usually a list of PINs will be prepared in advance) at step 434. On the other hand, in the case where the advertiser customizes the geographic parameters to be combined with the subscriber profile parameters (YES at step 426), the customized geographic parameters are retrieved and examined at step 428. Again, while the advertiser may have intended to customize the geographic parameters, it is possible that the selected parameters will match a predefined standard geographic parameter. In this case (YES at step 430), the subscriber PINs of the standard geographic are identified (usually a list of PINs is prepared in advance) at step 434. Otherwise (NO at step 430), the subscriber PINs of subscribers having geographies which are compatible with the customized parameters are identified at step 432.

Once the list of PINs matching the geographic parameters as been prepared (step 432 or step 434), the subscriber profile parameters set up by the advertiser are examined. In the case of a standard subscriber profile category (NO at step 436), the subscriber PINs of the category audience are examined (usually in a list of PINs is prepared in advance) to identify, at step 444, any which match the list of PINs matching the geographic parameters. The message or message ID is then stored in the appropriate individual subscriber queues as identified by the matching PINs (step 446).

In the case where the advertiser has selected to customize the target subscriber profile (YES at step 436), the targeting parameters (e.g., age, gender, income level, etc.) are retrieved and examined at step 438. Once again, while the advertiser may have intended to customize parameters, it is possible that the selected parameters will match a predefined standard category of parameters. In this case (YES at step 440), the subscriber PINs of the category audience are examined (usually in a list of PINs is prepared in advance) to identify, at step 444, any which match the list of PINs matching the geographic parameters. The message or message ID is then stored in the appropriate individual subscriber queues as identified by the matching PINs (step 446). Otherwise (NO at step 440), the subscriber PINs of the customized audience are examined (usually in a list of PINs is prepared in advance) to identify, at step 442, any which match the list of PINs matching the geographic parameters, and the message or message ID is then stored in the appropriate individual subscriber queues as identified by the matching PINs (step 446).

As is apparent from the above, while dedicated geographic and general queues are employed in the system according to the embodiment of FIG. 4, no separate or dedicated category queue is provided. Rather, so-called categories of subscribers are predefined by PIN number, and messages are deposited in the individual queues accordingly. In effect, a virtual category "queue" if formed by a PIN list indicating all subscribers (individual queues) associated with the respective category, each of which is identified by a unique individual QIN. Similarly, individual queues are used to store messages in the case where customized or standard geographic parameters are combined with customized or standard subscriber profile parameters. In the case of geographic-only parameters, the dedicated geographic queues are formed by ANI lists indicating all ANI's (originating telephone or station numbers) associated with corresponding geographic regions, each of which is identified by a unique geographic QIN.

Returning to FIG. 2, reference numeral 216 denotes a call processor which retrieves the messages designated in the message queues 208 through 214 for delivery to the calling party 218 and/or the called party 222 via a telephone switching network 220. It is noted that the call processor 216 and the association processor 206 can be implemented by physical distinct processors, or a single processor having multitasking functions. An exemplary operation of the call processor 216 is described below with reference to FIGS. 5(a) and 5(b).

When a subscriber enters their assigned PIN (step 502), the call processor immediately checks the corresponding individual queue (retrieve individual message associations) for the next message to be played (step 504). If a message or message pointer is contained in the subscriber's individual queue, the message is played or reproduced for the subscriber either before or after the subscriber is connected to the called party (step 506). If no such message exists (all individually associated messages meeting required criteria have been played), or no such associations have been established (NO at step 504), the system toggles to the next queue (category box). In the case where the empty individual queue provides a QIN pointing to a relevant a category queue (YES at step 508) and a message exists in the category queue (YES at step 510), and the call processor draws and plays the first message designated in the queue (step 512). If no such messages or PIN designation exists, or upon depletion thereof (NO at step 508 or 510), or category QIN exixts, the system toggles to the geographic queue. If a message exists in the geographic queue specified by the ANI of the calling party (YES at step 514), the next message is played (step 516). And finally, if not such message exists in geographic queue of the ANI (NO at step 514), the next message contained in the general queue is played (step 518).

Figure 5A:
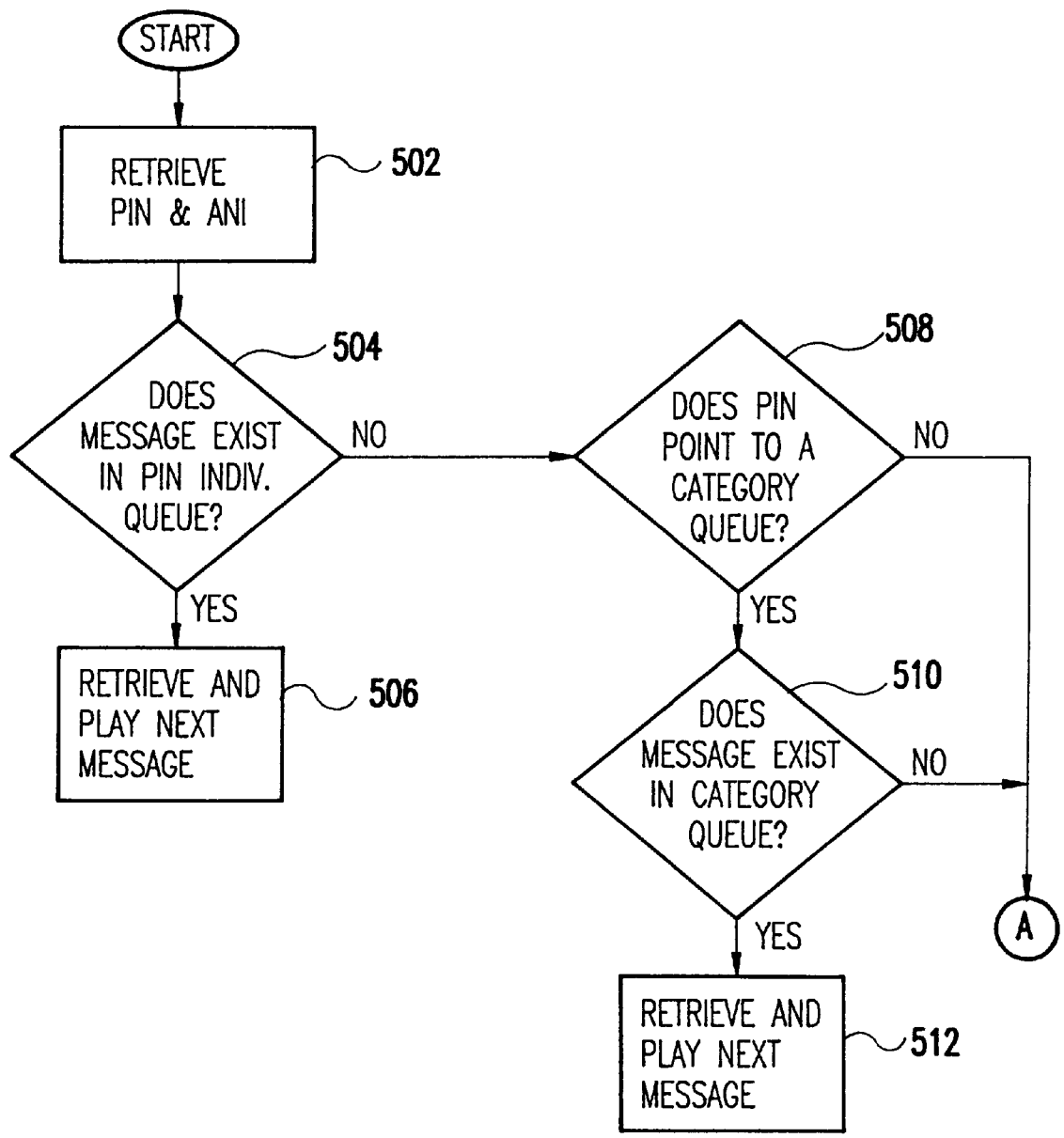
FIGS. 5(a)–5(b) constitute a flow chart for explaining the extraction of message association from the electronic queues during call processing.
Figure 5B:
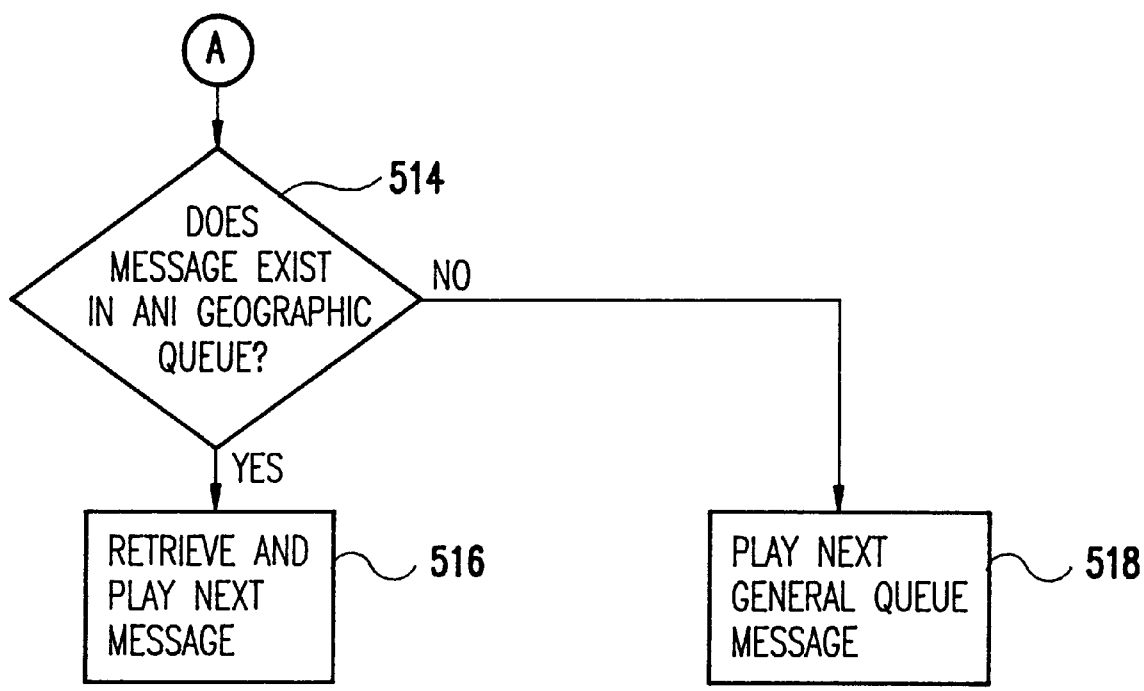

Preferably, the search routine of FIGS. 5(a) and 5(b) is predefined and strictly mechanical to minimize processing at the time of the call. This is enabled by the fact that message associations have been pre-established and associated messages presorted within each queue by way of coding logic described later. This allows the system to simply toggle from queue to queue, retrieving the first (next) message in the queue, without the need for matching messages to subscribers at the time the call is placed.

Figure 6A:
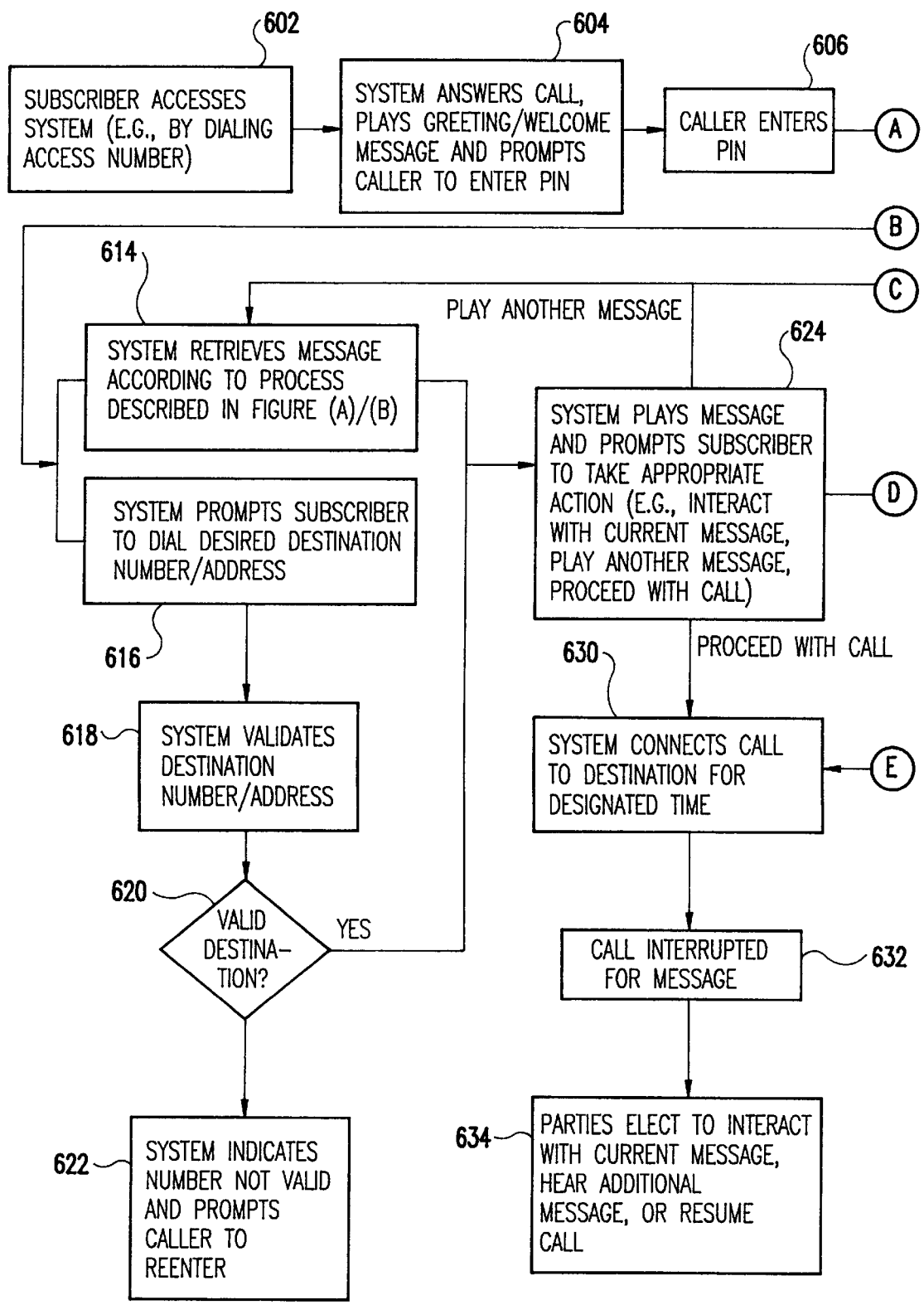
FIG. 6 illustrates an example of the operation of the call processor during a call connection sequence.
Figure 6B:
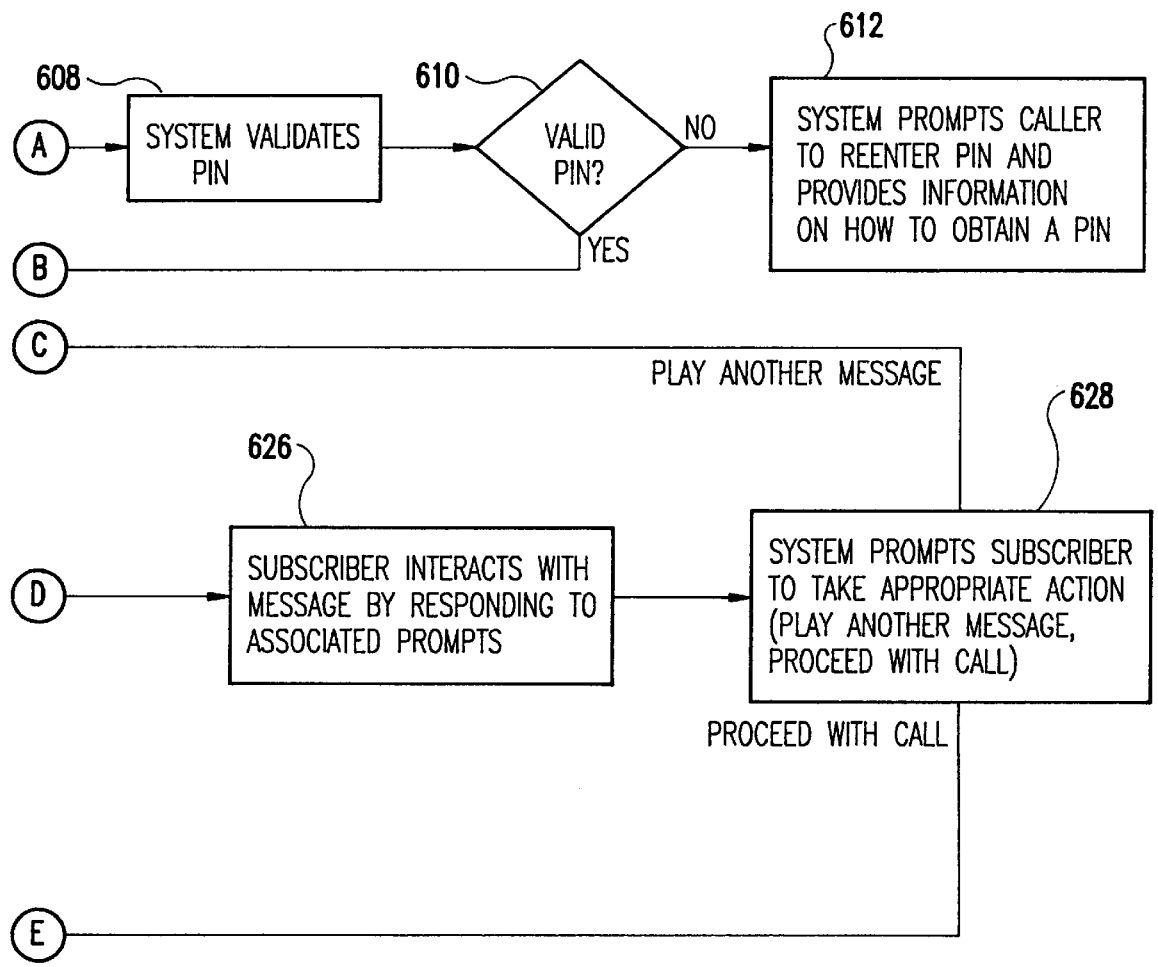

A more detailed example of the call-completion operation of the call processor 216 shown in FIG. 6. In this example, before the call is connected, the caller listens to the message and is given the option to interact with the message or listen to another message . As shown, once the subscriber accesses the system (for example, by dialing an access number) as step 602, the system answers the call, plays a greeting or welcome message, and prompts the caller to enter his or her PIN (step 604). Once the PIN is entered (step 606), the system checks the validity of the PIN (step 608). In the case of an invalid PIN (NO at step 610), the caller is prompted to reenter the PIN and/or is instructed in the manner of obtaining a PIN.

Assuming the PIN to be valid (YES at step 610), the system retrieves the appropriate message (step 614) according to the process, for example, described above in connection with FIGS. 5(a) and 5(b). In addition, the system prompts the user to dial the desired destination number or to enter the desired destination address (step 616). The destination number is validated at step 618, and in the case of an invalid destination number or address (NO at step 620), the system informs the caller that the number or address is invalid and prompts the caller to reenter the same (step 622).

In the case of a valid destination number or address (YES at step 620), the system plays the message retrieved at step 614. Then, after allowing the subscriber to listen to the message, the system prompts the subscriber select the next appropriate action, i.e., to interact with the current message, to play another message, or to proceed with the call (step 624).

When the subscriber elects to listen to another message, the process returns to step 614 to retrieve another message, and then step 624 is repeated. When the subscriber instead elects to interact with the message, associated prompts are played or transmitted to the subscriber, and the subscriber interactively responds by use of a touch-tone keypad of a phone, a computer keyboard, and the like (step 626). Next upon completion of the message interaction, the system prompts the subscriber to select either presentation of another message or processing of the call (step 628). As before, if the subscriber elects to be presented with another message, the process returns to step 614.

In the case where the subscriber elects to proceed with the call (at step 624 or step 628), the system connects the call to the destination for a designated amount of time (step 630). Then, at the designated time, the call is interrupted with another message (step 632), and the parties are prompted to elect to interact with the message, be presented with an additional message, or resume the call (step 634). Although not shown in FIG. 6, steps 632 and 634 are similar to steps 614 and 624 described in more detail above. The call continues in this manner until termination.

The multi-box design with predefined polling feature is configured to accomplish several key objectives. First, it minimizes the likelihood that a subscriber accessing the system will be unable to do so due to lack of available messages. As advertisers will desire to target different segments of the market at different times, a portion of the subscriber population at any given time may fail to meet the targeting criteria defined for active campaigns. As a result, such subscribers may have few or no messages in their individual message boxes. The multi-box queuing feature allows these subscribers to utilize the system by drawing from alternative queues (i.e., category, geographic and general). This is important in ensuring system availability and reliability as perceived by the subscriber.

Second, the use of multiple queue types enhances the ability to provide differential qualities of service to advertisers. Naturally, targeting precision, distribution control and reporting specificity decrease with increasing queue generation and/or with decreasing specificity of message associations. Different service levels will command different advertising prices. Advertisers will therefore have greater flexibility in controlling the specificity of their targeting efforts as well as the cost per impression of reaching potential customers by specifying delivery to particular queues or combinations thereof. For example, an advertiser may wish to deliver a message to individuals meeting a specified socio-demographic profile (e.g., heads of households with a total family income exceeding $50,000 per year within the greater Pittsburgh metropolitan area) AND to all subscribers living within a specified geographic area (e.g., in and around the downtown area).

Third, the multi-box design automatically selects the most targeted (profitable) messages first. This supports increased service reliability by maximizing message availability, while doing so in an economically maximizing way by sequencing from the most targeted (and, therefore, highest value) to the least targeted associations.

Finally, the multi-box design increases the systems overall flexibility allowing, for example, subscribers to access and use the service while they are traveling in areas from which their individual message boxes may be inaccessible. This capability may become important in providing reliable service to the 'away-from-home' calling market (e.g., collect, card or pay-phone calls).

The preferred embodiment described herein is configured to support two principal message types, i.e., one-way (non-interactive) delivery of advertisements, promotional messages and announcements, and two-way (interactive) messages (including advertisements, promotional messages and announcements) which elicit and capture responses from message recipients (e.g., feedback on advertisements and promotions, opinion polls, and surveys).

These messages can be delivered in audio forinat to devices equipped for audio-only communications (e.g., traditional telephones), and in audio/visual format for more advanced telephony devices (e.g., screen phones, video phones).

The system is also configured to support a wide range of functionality to meet the message delivery specifications provided by third party sponsors. Sponsors can specify message delivery requirements using one or more of these functionality's in any combination to fully characterize their "campaign." The term "campaign" refers generally to a sponsor's order for delivery of messages, and the term "campaign parameters" refers to the set of definable functionalities with which a sponsor can characterize a campaign. In the preferred embodiment, these functionalities include message volume specification, message targeting, conditional message delivery, message grouping and sequencing, message frequency, interactivity, information capture, cut-through, geographical referral, and campaign updates. Each of these functionalities characterizing a campaign is discussed in turn below.

Message Volume Specification. Volume specification allows a sponsor to define the desired number of messages to be delivered subject to campaign parameters (i.e., combinations of functionalities which characterize the sponsor's campaign). It is noted that the system automatically tracks the volume of messages actually delivered subject to campaign parameters so that sponsors pay only for delivered messages. Message volume specification defines the total number of messages to be delivered, as well as the total number of individuals to whom the messages are to be delivered.

Message Targeting. Targeting defines the individuals and/or groups that a sponsor is aiming to reach with their message, advertising, survey, etc. These individuals or groups are characterized by targeting parameters which can include any combination of geography, age, income, occupation, marital/familial status, home-ownership status, hobbies, special interests, etc. When individual end-users subscribe to the service, they will complete a "customer profile" as part of the registration process which will capture relevant defining characteristics to be used for targeting purposes. In short, targeting parameters can specify any information captured in customer profiles or other targeting data (e.g., external mailing list data sources) to precisely define the target group or individuals to whom messages should be delivered. The preferred embodiment supports flexible message targeting ranging from untargeted delivery of messages to practically unlimited mass audiences (i.e., including every individual with access to a telephone), to precision targeted message delivery to groups and/or individuals defined by specific targeting parameters (e.g., including psycho/demo-graphics, hobbies and special interests, and even by specific telephone number(s)).

Conditional Message Delivery. Conditional message delivery allows sponsors to define specific conditions under which messages should be distributed to desired end-users. For example, conditional message delivery could include delivery of messages during specified periods of time, including calendar periods and times of day. A sponsor can specify that a message run only during the summer months of June, July and August between 11:00 am and 5:00 PM or every Monday evening between 7:00 PM and 11:00 PM throughout football season, etc. Sponsors can specify any desired degree of timing conditions, including no timing requirements for open ended campaigns. Conditional message delivery might also include delivery of messages in response to internal and/or external triggers/pre-specified conditions established by a third party sponsor. For example, a mortgage refinancing company would be able specify delivery of messages or advertisements to homeowners in response to fluctuations in market interest rates above or below pre-defined thresholds.

Message Grouping and Sequencing. Message grouping and sequencing allows messages to be grouped and/or sequenced as specified by a third party sponsor. For example, a sponsor may wish to play different message versions related to the same advertising campaign in a specified sequence one after the other (i.e., without interjection of messages from other sponsors). This capability allows advertisers to string a series of messages together in a specified sequence in order to create story-lines which unfold as callers hear additional messages. Message grouping and sequencing further allows specified messages to be designated as 'first-play' messages (i.e., the first message presented to a caller upon accessing the system). For example, messages designed for interactivity or cut-through can be played first, before the called party is on the line. This allows for the message recipient (end-user) to interact with the message and/or cut-through to a third party call center without inconveniencing the called end-user.

Message Frequency. Message frequency allows sponsors to specify the number of times and over what period of time individuals (end-users) should be exposed to the message (e.g., only one exposure per individual throughout the life of the campaign; no more than ten exposures per individual per month; two sequential exposures/repetitions of the same message per individual per call; etc.).

Delivery interval/timing. Allows advertisers to define the time(s) of day, day(s) of the week, week(s) of the month, special occasions, seasons, etc., during which a message is to be delivered.

Interactivity. Interactivity allows message recipients to interact with the system at any time during or upon completion of messages. The system is designed to support the elicitation of both passive responses from recipients to stimulate action (the responses are passive in that they do not affect the presentation of the message), and active responses from message recipients during or upon conclusion of messages which control (or vector) message presentation (i.e., repeat/rewind message, branch to optional message segments based on choices entered, etc.). Passive responses can be used either to engage in "mock dialog" (in which the responses are designed simply to stimulate positive action (e.g., key-pad strokes) for the purpose of improving attention, retention and recall), or to engage in actual dialog in which responses are captured by the system for subsequent analysis and evaluation (i.e., 'information capture' described below).

Information Capture. Information capture allows sponsors to obtain information from message recipients through capture of responses (e.g., key-pad strokes) from recipients during or upon conclusion of messages to obtain information, feedback, opinions, requests for additional information, catalogs, etc.

Cut-Through. Cut-through allows recipients to 'cut-through' to a third party (e.g., sales or service center) to obtain additional information, place an order, etc.

Geographic Referral. Geographic referral allows sponsors to specify that a particular message be played only when the caller is from a specified geography and the call recipient is from a specified geography (either the same or different from the caller's geography). For example, an airline may wish to specify that a message promoting a special weekend travel fair be played only for callers from New York placing calls to locations in California.

Campaign Updates. Campaign updates include real-time updates to message content at any time during a campaign. For example, an advertiser can change the quoted promotional price or other terms in response to observed campaign results. Campaign updates also include real-time updates to campaign targeting parameters at any time during a campaign. For example, an advertiser can broaden or tighten target segments by modifying targeting parameters for subsequent message deliveries. Further, campaign updates include real-time updates to conditional delivery parameters. For example, an advertising can broaden or narrow the time of day, days of week, trigger event thresholds, etc., during which messages are played, at any time during a campaign. Still further, campaign updates include real-time updates to message grouping, sequencing and frequency specifications. For example, an advertiser can modify the number of sequential exposures, the order of related messages in a group, or the composition of messages in a group (e.g., adding or removing messages to groups), at any time during a campaign.

Figure 7:
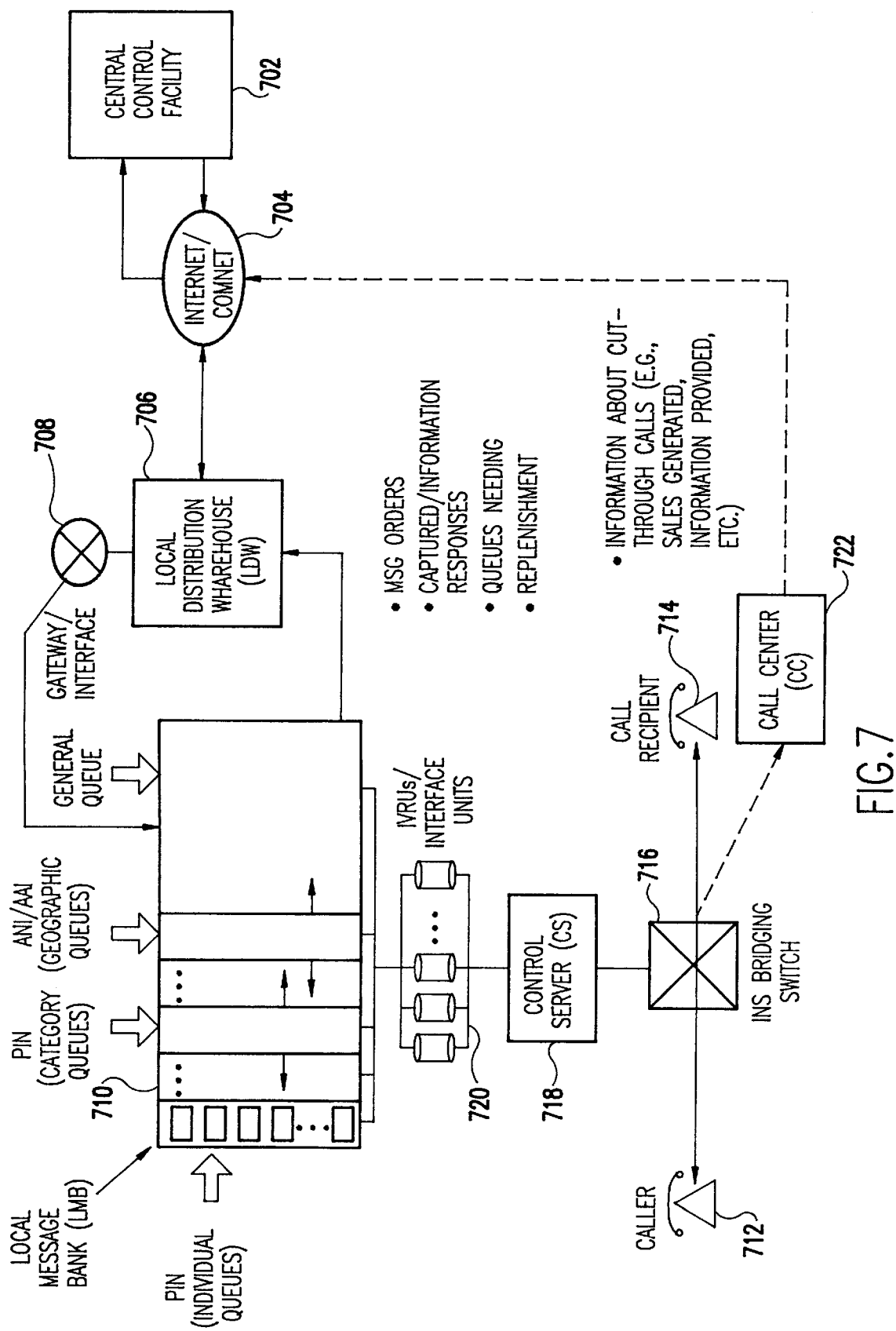
FIG. 7 is a block diagram of a telephony network according to a preferred embodiment of the present invention.
Figure 8A:
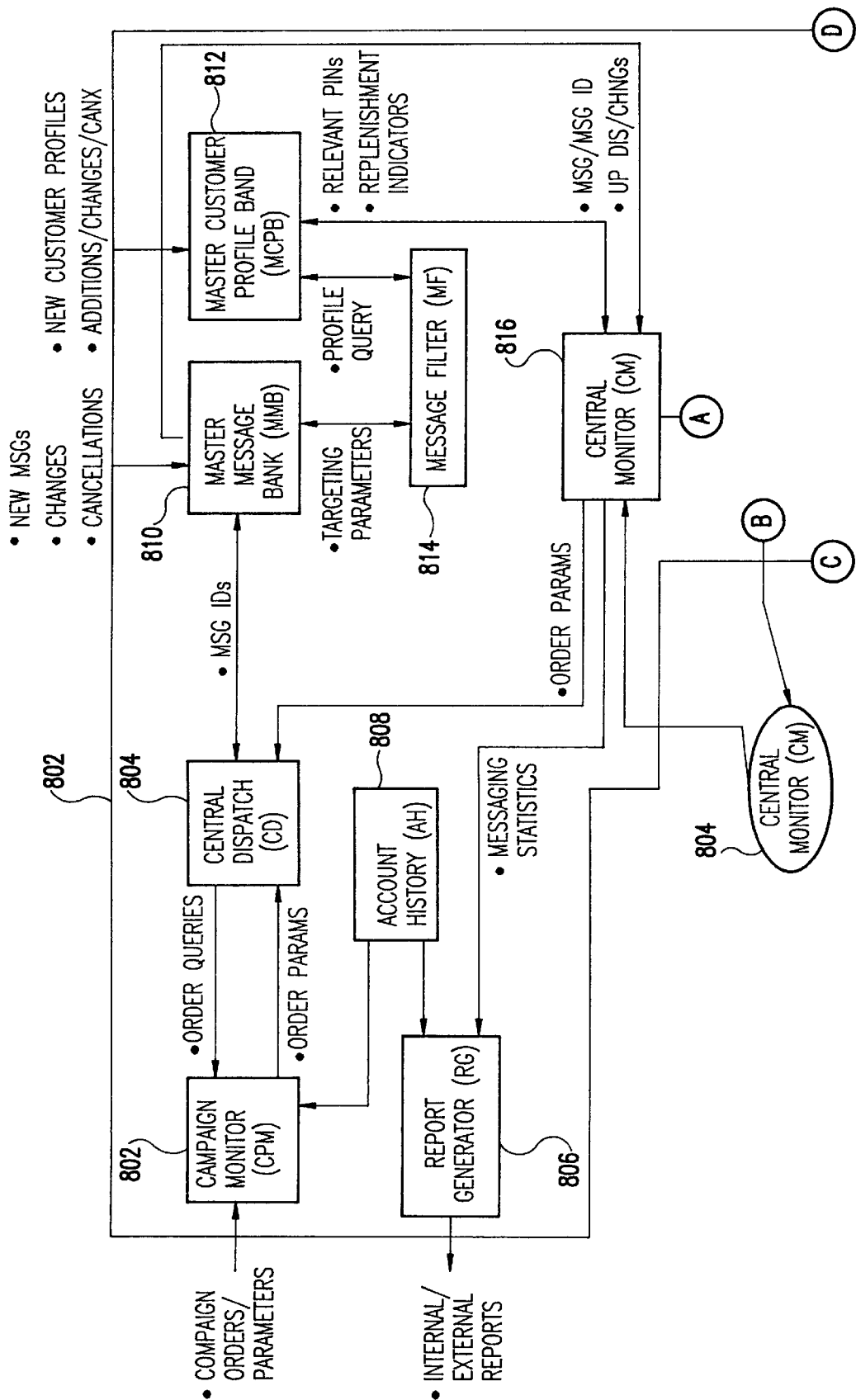
FIG. 8 is a block diagram of the central control facility of the telephony network of the preferred embodiment of the present invention.
Figure 8B:
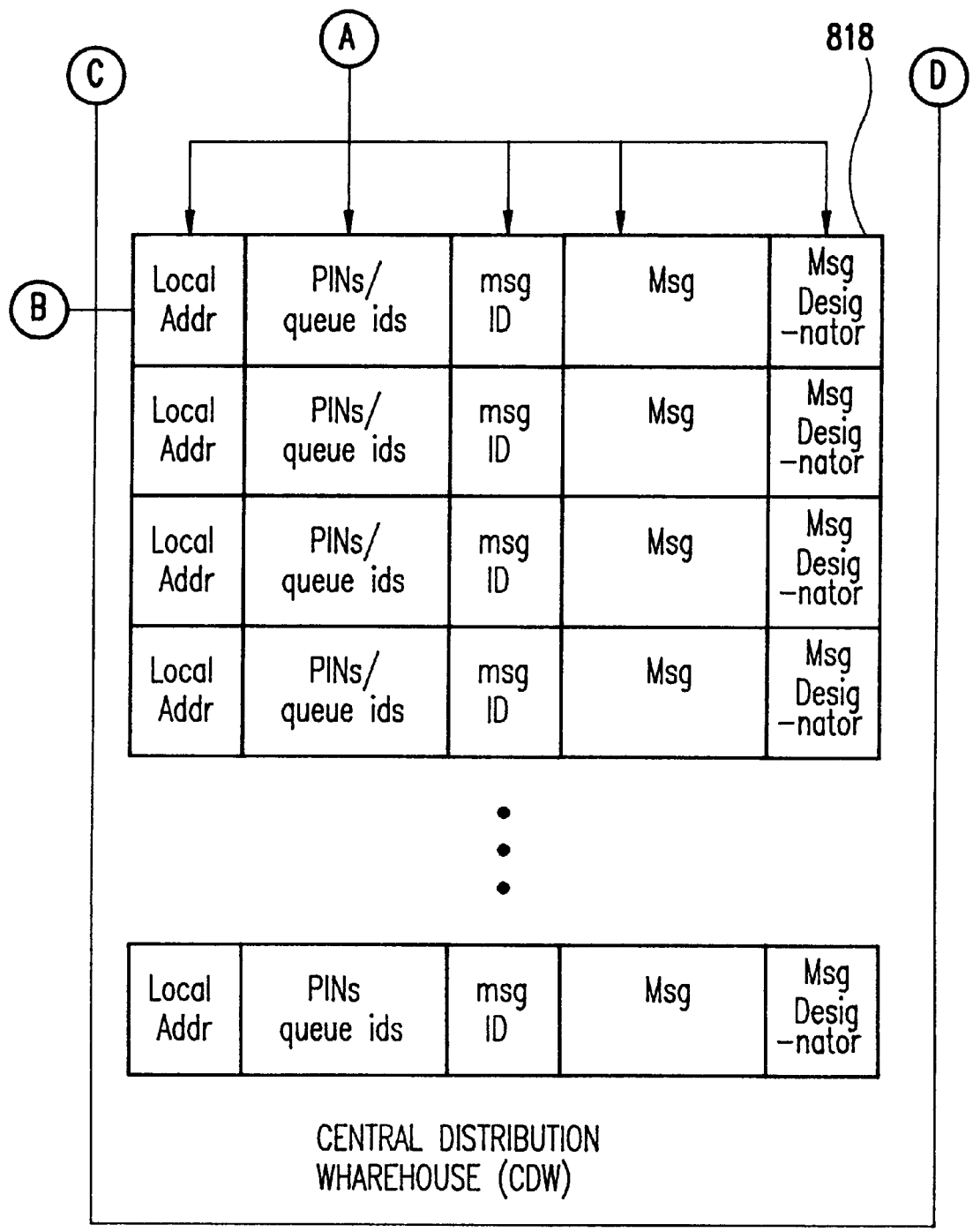

Referring now to FIGS. 7 and 8, each showing logical architectures including key components, interrelationships and selected information flows of the telephony network of the preferred embodiment will now be described.

FIG. 7 illustrates the logical architecture of the telephony network according to a preferred embodiment of the invention. As described in detail below, the network includes a central control facility 702 interfacing with a local distribution warehouse (LDW) 706 via internet/comnet media 704. The LDW 706 in turn interfaces with a local message bank (LMB) 710 via a gateway/interface 708. A caller 712 is connected to a call recipient 714 through an intelligent network system (INS) bridging switch 716. The INS bridging switch 716 is controlled by a control server (CS) 718 which interfaces with the LMB 710 via interactive voice response units (IVRUs)/interface units 720.

FIG. 8 shows details of the logical architecture of the central control facility 702 of the telephony network of FIG. 7. Again as will be described in detail below, the central control facility 702 includes a campaign monitor module (CPM) 802, a central dispatch module (CD) 804, a report generator module (RG) 806, an account history module (AH) 808, a master message bank module (MMB) 810, a master customer profile bank module (MCPB) 812, a message filter module (MF) 814, a central monitor module (CM) 816 and a central distribution warehouse module 818.

Each of the component parts shown in FIGS. 7 and 8 are described below. As should be appreciated, the modules are primarily implemented as self-contained software components interacting within the system as a whole. The modules are programmed as described below to handle specific tasks within the system. Of course, combinations of hardware and software component implementations are possible, as well as combining two or more modules into single but more complex modules.

The campaign monitor module (CPM) 802 is a schedule coordinator which works with the central dispatch module (CD) 804 (described below) to deliver messages in a timely way to best meet campaign criteria specified by sponsors. (Herein, "sponsors" refers to organizations and/or individuals sponsoring the messages for delivery to customers. Also, "customers" or "end-users" refers to individuals using the system to whom messages are delivered.) The CPM 802 primarily functions to ensure that messages selected for distribution are prioritized to reflect campaign parameters and current campaign status's as established by the sponsors.

For example, assume that there are only two active campaigns. The first specifies delivery of one million messages during the month of March, and the second specifies delivery of one million messages during the period from March through May. The current status of the first campaign indicates that, as of March 15, only 250 k of its messages have been delivered, while as of the same date, only 200 k messages have been delivered for the second campaign. Assume also that only one message is requested from CD 804 to replenish message queues (as described below). Lacking any appropriate logic, the system would arbitrarily select a message identifier (MSG ID) (also described below) from among these two campaigns.

The CPM 802 thus includes programming logic to properly sequence MSG IDs for distribution. In this case, even though the first campaign had 25% of its message deliveries fulfilled, while the second campaign had only 20% fulfilled, the CPM 802 logic ensures that the message corresponding to the first campaign is selected for distribution because of the imminent campaign close date.

In short, the CPM 802 receives, stores and manages campaign order information and specifications/parameters (e.g., volume and timing) keeping track of all active campaign orders and their ongoing status's. The CPM 802 receives updates on message deliveries from the central monitor module (CM) 816 in order to maintain current status's for active campaigns. In addition, the CPM 802 prioritizes campaigns based on campaign parameters (e.g., volume and timing commitments) and their current status's (e.g., with respect to volume and timing) to determine a replenishment sequence for the dispatch of additional messages (i.e., when the CD 804 requests additional messages to refill customer message queues as they are depleted, the CPM 802 provides the message ID for the next message to distribute). Further, the CPM 802 provides campaign parameters and status information to the report generator module (RG) 806 for analysis and reporting purposes (described below).

The central dispatch module (CD) 804 is the interface between the CPM 802 and the modules involved in a message replenishment cycle. Initially, the CD 804 receives a signal from the central monitor module (CM) 816 indicating the need for message delivery. Next, a query is made to the CPM 802 to identify a next priority message (designated by MSG ID), as well as any other campaign specifications including but not limited to the number of copies to be distributed, the number of end-users to whom they should be distributed, limits on copies per end-user, etc. The CD 804 additionally forwards corresponding MSG ID(s) to the master message bank module (MMB) 810, and forwards campaign specifications/constraints (i.e., defined campaign parameters) to the CM 816.

The master message bank (MMB) 816 receives, stores and maintains a copy of all messages (actual media clips/scripts) and their associated targeting parameters for all active campaigns. Messages may be in the form of simple audio clips (i.e., for one-way delivery of audio messages), audio scripts (i.e., to include any interactive segments including information capture, cut-through triggers and numbers), text, still and/or full motion graphic/video clips, and multi-media clips including any combination of audio, text, graphic and video media.

Upon receipt of a new order (campaign initiation), the MMB 816 generates a message identification code (MSG ID) and stores a copy of the message and its associated targeting parameters (targeting parameters reflect content and format of customer profile data, and include definition of "strength" (e.g., exact matches, strong matches, loose matches, etc.)). The MSG ID embodies "dynamic campaign requirements" (e.g., timing, frequency, grouping, sequencing criteria specified in the campaign order for the corresponding message). A detailed description of MSG ID code logic is set forth below. Upon receipt of the new order, the MMB 816 provides MSG ID(s) associated with the new campaign message(s) to the campaign monitor module (CPM) 802 and any other modules requiring this information.

Upon receipt of a change order, the MMB 816 modifies message and/or targeting parameters accordingly. If the change is intended to alter the message itself rather than targeting parameters, the MMB 810 forwards the MSG ID and a copy of the updated message to the CM, which then initiates an update of all outstanding copies of the original message. If the change is intended to alter the message targeting parameters, then all outstanding copies of the message may be deleted with the message redistributed to the updated target audience. Alternatively, if the updated target audience represents a subset of the original target audience, then the message or message ID may be purged only from those queues for which the targeting parameters are no longer relevant. If the update targeting parameters represent a superset of the original target audience (i.e., they include the original audience and extend it to additional subscribers by, for example, relaxing target parameters), then the message or message ID may be distributed to the new queues appropriately.

Upon receipt of a completion or cancellation order, the MMB 816 purges all information associated with the relevant message from its active files, and stores a copy in its history file.

Upon receipt of a MSG ID from CD 804, the MMB 816 transfers relevant targeting parameters to the message filter module (MF) 814, and forwards the MSG ID and a copy of the message to the CM 816 for subsequent distribution.

Upon receipt of profile parameters from the master customer profile bank module (MCPB) 812 through the MF 814 (i.e., the reverse replenishment cycle described below), the MMB 816 forwards corresponding/matching MSG IDs to CD 816, where CD 816 then checks the CPM 802 to ascertain whether the corresponding campaign(s) call for delivery of associated message(s). If so, the forward replenishment cycle resumes with the corresponding MSG ID(s) triggered by the CD 816.

The message filter module (MF) 814 matches messages with appropriate end-users, including individual, category, geographic and/or general queues. In the normal (forward) replenishment cycle, the MF 814 receives targeting parameters from the MMB 810 and initiates a query to the MCPB 812 based on these targeting parameters. In the reverse replenishment cycle, the MF 814 receives profile parameters from the MCPB 812 corresponding to queues (message boxes including individual, category, geographic and general) in need of replenishment if the queues remain in a "replenishment required" (RR) status after the normal replenishment cycle. This essentially reverses the replenishment cycle (i.e., instead of pushing messages to the appropriate queues, the system attempts to pull appropriate messages to queues in need of replenishment). The reverse replenishment cycle can be triggered automatically and/or through manual intervention.

The master customer profile bank module (MCPB) 812 receives, stores and maintains profile information for all subscribed customers, and indicates which message boxes, including individual, category, geographic and general queues, require replenishment. In practice, the MCPB 812 may treat category, geographic and general queues analogously to individual subscribers. Each of these is identified by a QIN (analogous to a PIN) and characterized by queue parameters (analogous to subscriber profile data).

Upon receipt of a new customer activation request, the MCPB 812 generates a customer identification code PIN and captures relevant profile information. Similarly, upon receipt of a new category or geographic queue activation request, the MCPB 812 generates a QIN and captures relevant queue parameters.

Upon receipt of a profile change order, the MCPB 812 modifies customer profile or category or geographic queue parameters information accordingly.

Upon receipt of a PIN change request, the MCPB 812 checks availability and updates records accordingly. A new PIN request may be initiated by a customer and/or by the company.

Upon receipt of a profile query from the MF 814, the MCPB 812 scans all customer profiles according to the process described in FIG. 4, and identifies all those matching the targeting parameters that are in a RR status (i.e., it essentially ignores profiles for which message replenishment is not called for to avoid sending messages to boxes that are already filled). Additionally, the MCPB 812 transfers all relevant PINs associated with the MSG ID which generated the query to the CM 816 to support subsequent distribution of messages or message IDs to the appropriate queues.

The MCPB 812 also monitors customer account activity to facilitate problem identification and resolution. For example, if a particular PIN (or message box identifier) has not been transferred to the CM 816 for a specified period of time (indicating low or no activity for the associated message box), a flag is set for follow-up action (e.g., assess whether appropriate messages exist but are simply not triggering delivery to the PIN, or whether there are simply no messages available for delivery; call user to ascertain reason not using the system and take corrected action as warranted, including purge if no longer using service and can't be salvaged). As another example, if a PIN is being transferred to the CM 816 with unusually high frequency, the MCPB 812 reviews account activity to determine the likely cause and assess messaging dynamics (i.e., system error; possibility of shared PIN; gaming the system; simply a heavy user, etc. If sufficient heavy users exist, an economic order quantity (EOQ) is adjusted accordingly).

Upon receipt of RR indicator from CM 816 (as described below), the MCPB either turns on or turns off the associated RR indicator for the specified PIN(s) and/or category/geographic/general queues. This essentially establishes whether or not a particular message box, identified by QIN, is in need of replenishment.

The MCPB 812 additionally sends profile parameters for those QINs (including individual, category, geographic and/or general queues) needing replenishment to the MF 814 if the RRs persist through the normal replenishment cycle(s) (i.e., a queue needs to be replenished, but no appropriate MSG IDs have been presented). This essentially reverses the replenishment cycle with the MCPB 812 sending a query through the MF 814 to the MMB 810 in an attempt to identify relevant messages for the corresponding queues that need to be replenished. The MMB 810 identifies all MSG IDs matching the MCPB 812 query, and checks with the CPM 802 through the CD 804 to find whether a campaign associated with the MSG IDs calls for message distribution. As described above, the normal replenishment cycle is resumed if MSG ID's are thereby retrieved. If the PR indicators persist, depending on circumstances, this may lead to manual intervention as required to override and/or adjust campaign parameters (e.g., target parameter "strengths" could be adjusted if it is discovered that they are set too stringently; e.g., a campaign targeting 22–30 year old individuals could be adjusted to include 22–35 year old individuals).

Also, the MCPB 812 checks for validity of internal customer profile information by cross-checking selected entries against independent data sources including externally provided mailing/marketing lists, phone lists, etc.

The central monitor module (CM) 816 initiates message replenishment requests, controls message recipients by staging messages for delivery to appropriate locations (physical and logical), and tracks and reports messaging statistics.

That is, the CM 816 maintains a comprehensive database for all active PINs (i.e., those to which a message has previously been distributed and are still "live") of message history and the local distribution warehouse module (LDW) 706 address associated with each PIN/message box. The message history includes all active MSG IDs distributed to date (i.e., those associated with an active campaign). The MSG IDs are organized for each PIN in chronological order with each entry date-stamped with the date of distribution. The associated LDW 706 addresses enables messages to be routed to the appropriate local message bank module (LMB) 710 corresponding to a message box identified by a specified PIN. For new subscribers, this information is loaded as part of the activation process.

Figure 9:
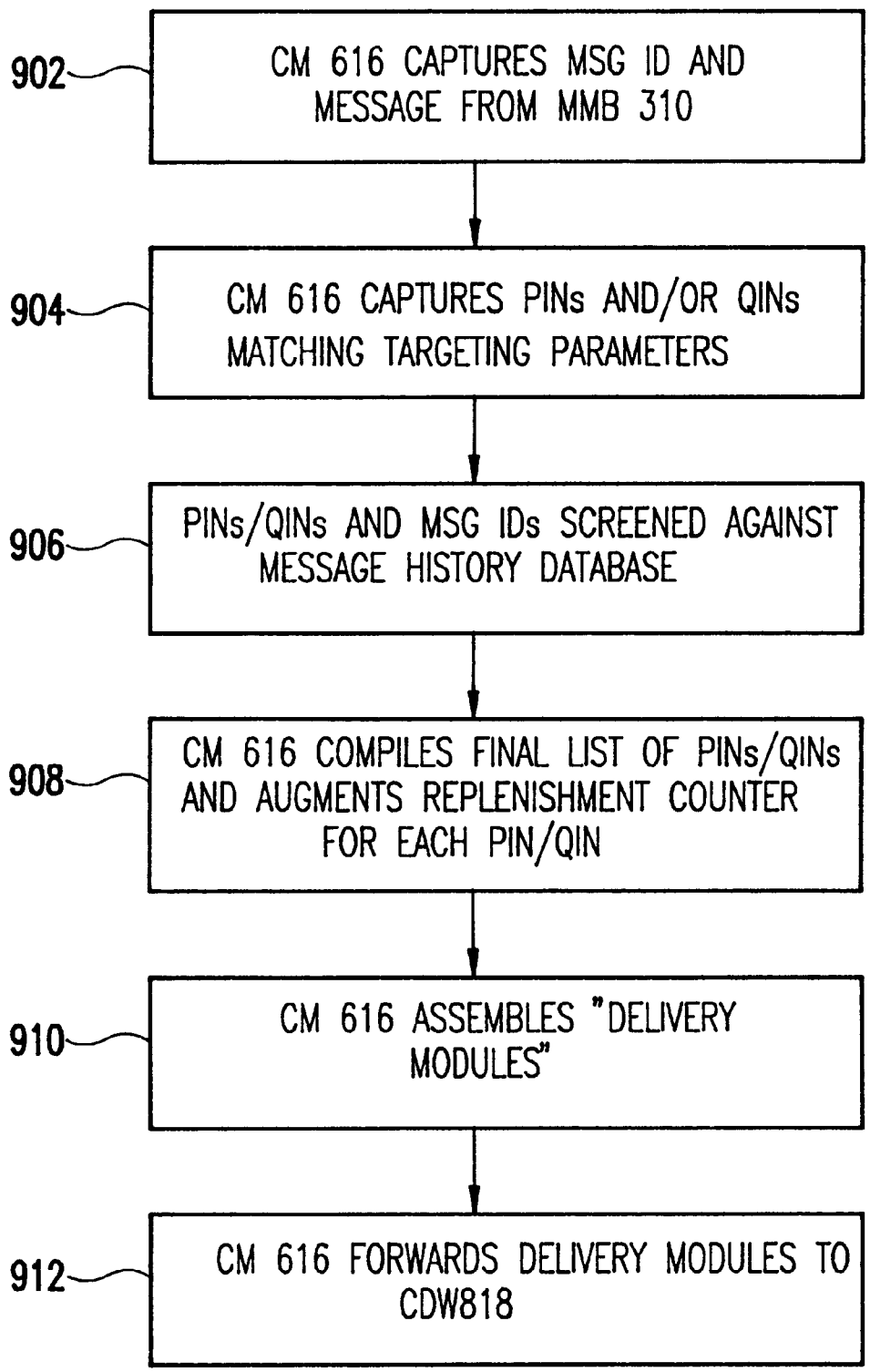
FIG. 9 is a flowchart describing staging of messages for distribution to a local distribution warehouse module and a local message bank module.

When the message replenishment cycle has been initiated by the central dispatch module (CD) 804 (i.e., the CD 804 sends MSG ID to MMB 810 to designate the next message to be distributed), the CM 816 stages messages for distribution to the local distribution warehouse module (LDW) 818 and ultimately to the local message bank module (LMB) 710 by interacting with the MMB 810, the MCPB 812 and the central distribution warehouse (CDW) 818 as shown in FIG. 9.

That is, as shown in FIG. 9, the CM 816 captures MSG ID and the associated message from the MMB 810 (step 902). In addition, the CM 816 captures all QINs matching targeting parameters sent from the MCPB 812 (step 904). Note that only QINs for which the replenishment required (RR) indicator was "turned on" will be included, thereby avoiding unnecessary distribution to already filled message boxes. This is designed to improve media accountability as messages delivered to an already filled box ultimately would not be delivered, even though the CM 816 would have assumed it had been. The PINs and MSG IDs are then screened against message history database to enforce timing, frequency, grouping and sequencing criteria specified in the campaign parameters (step 906). If distribution of a particular message to a specific PIN/queue violates specified campaign parameters, the PIN is removed from the distribution list. For example, if distribution of a message to a particular message box implies that the box would receive two identical messages one after the other, while the associated campaign parameter specifications preclude this from happening, the message is not sent to the message box identified by that PIN/queue identifier.

The CM 816 then compiles a final list of QINs (after filtering with message history database) for delivery of message (step 908), and augments a replenishment counter for each such QIN. Once a specific QIN counter reaches the specified EOQ (i.e., enough messages have been forwarded to refill the box to capacity), the CM 816 "turns off" the RR indicator for the associated QIN at the MCPB 812. This will preclude that QIN (queue) from receiving additional messages until the RR is again turned on.

The CM 816 then groups PINs in accordance with the relevant LDW 706 location (i.e., LDWs serving geography/area (physical and/or logical) associated with the customer corresponding to PIN) (step 910), and then assembles "delivery modules" (step 912). Each delivery module includes: the LDW 706 address; all relevant QINs associated with the corresponding LDW 706; the MSG ID and a copy of the associated message; and a designator to indicate whether the module represents an addition of new messages to boxes, a modification of existing messages, both an addition of new messages with concurrent modification of outstanding copies, or a deletion of messages. In the event of modifications, the CM 816 will include MSG IDs for the new and associated outstanding messages. The CM 816 then forwards delivery modules to the CDW 818 for subsequent delivery to the appropriate LDW(s) 706 (step 914).

Upon receipt of a message replenishment order from the LDW 706 (which consists of a listing of all QINs associated with individual message boxes as well as all category, geographic and general queues needing replenishment), the CM 816 turns on the RR indicator at the MCPB 812 to designate each QIN/queue requiring message replenishment. The category, geographic and general queues at the LMBs 710 correspond to "virtual" end-users (i.e., they are assigned an identifier/QIN which resides in the MCPB 812). Therefore, their corresponding RR indicators will be turned on as well, indicating a need to replenish their queues. Note that the use of EOQs implies that, once a replenishment order is received, the CM 816 knows precisely how many messages to forward to the corresponding PIN. This significantly simplifies the message distribution process while enhancing accountability.

Upon receipt of replenishment orders, the CM 816 signals the CD 804 that additional messages are required. The CM 816 keeps track of the QINs (or queues) requiring replenishment, as well as the number of messages required per queue (based on specified EOQs), and periodically triggers a signal to the CD 804 until all queues have been appropriately replenished. If queues remain in a replenishment required status for a specified period of time, the reverse replenish cycle described above will be initiated. The CM 816 and MCPB 812 work together in this regard to ensure that queues are replenished. Moreover, the CM 816 and MCPB 812 should normally concur on boxes needing replenishment, to thus act as an additional safeguard.

The CM 816 also receives information collected in the course of interactive and/or capture mode messaging from the IVRUs 720 through the LDW 706. Interactive or capture mode messages/advertisements are those which elicit a response from the customer. The CM 816 captures this data and forwards it to the report generator (RG) 806 for analysis and reporting.

The CM 816 additionally transfers data associated with message delivery to the RG 806 for analysis and reporting. Information captured for analysis will include, for each message, number of plays over what period of time, number of customers to whom message played, specific customers to whom message played, timing, sequencing, etc. Essentially, for each queue (corresponding to all subscribed customer, category, geographic and general queues), the CM 816 will provide details on who listened to what messages when, and will report against all specified campaign order parameters (detailed below). The CM 816 will also report message delivery and queuing statistics/information for internal management and monitoring purposes including the definition of appropriate EOQs, ad/message sales priorities, fraud detection, fault detection, etc.

The central distribution warehouse module (CDW) 818 is the central staging area for messages (delivery modules, described above) en route to LDWs. It essentially acts as a store and forward facility, providing the required communications interfaces. As shown in FIG. 6, each delivery module stored in the CDW 818 includes: the LDW 706 address; all relevant QINs associated with the corresponding LDW 706; the MSG ID and a copy of the associated message; and a designator to indicate whether the module represents an addition of new messages to boxes, a modification of existing messages, both an addition of new messages with concurrent modification of outstanding copies, or a deletion of messages.

The report generator (RG) 806 functions to compile and analyze data and prepare predefined and ad-hoc reports for internal use and/or dissemination to clients. The RG obtains information from the CM 816, the CPM 802 and the AH 808. It is noted that preferably all system components or modules are capable of reporting local information (e.g., the MCPB 812 can provide information on current subscribers, profiles, replenishment requirements, etc.; the MMB 810 can provide information on active campaign messages, etc.). The focus of the RG 806 is on reporting operational/systemic statistics (e.g., number of messages played, to whom, when, etc.). The RG 806 also compares this information against campaign parameters housed in the CPM to report progress/conformity/variances against campaign criteria.

The internet/comnet 704 is simply the medium over which messages are distributed to the LDWs 706 from the central control facility 702, and through which information is returned from LDWs 706 to the central control facility 702. The specific medium can be any combination of public or private communications networks (e.g., Internet, Intranet, Circuit Switched network, etc.) and/or physical delivery networks for transportation of magnetic tape, documents, etc.

The local distribution warehouse module (LDW) 706 receives and stores message delivery modules from the CDW 816 for subsequent insertion into the appropriate message queues. It also acts as a local staging area for receipt of message replenishment orders, captured information (i.e., from interactive/capture mode messages), etc., for subsequent delivery of this return information to the CM 816.

Upon receipt of the message delivery module(s) from the CDW 818, the LDW 706 first stores the module. Then, the LDW 706 interfaces with the LMB 710 to insert a copy of the relevant messages into all queues identified by an accompanying QIN (including individual, category, geographic and/or general queues). If the message represents a change order (as distinguished by the CM 816 in compiling the delivery module), the LDW 706 replaces all copies of the associated message in all queues, and modifies the MSG ID if required to reflect changes in desired delivery dynamics (e.g., timing, sequencing, grouping, etc.). Note that the new MSG ID is assigned through the MMB 810. The LDW 706 also returns confirmation of receipt and insertion to the CM 816. If a message is inadvertently delivered to a full queue, the LDW 706 will notify the CM 816 of the MSG ID and associated PIN/queue identifier when it returns information to the CM 816. The CM 816 will then correct the message history file to reflect this information (i.e., the message was never delivered). This provides back-up for other safeguards to ensure strict media accountability and avoid discarding of messages.

The gateway/interface provides compatibility between the LDW 706 and the LMB 710 to ensure proper interfacing. It may or may not be required depending on delivery medium, data formats and protocols.

The local message bank module functions to store and arrange messages for retrieval by the IVRUs (i.e., when a customer places a call), to send message replenishment requests through the LDW 706 to the CM 816 when queues are depleted beyond the EOQ level specified, and to perform local message management tasks (e.g., indicate when a message has 'expired'—it's effective campaign date has elapsed). It is noted that the term IVRU (described below) refers generally to the interface unit that controls interaction between the LMB 710 and the end-user.

As illustrated in FIG. 7 messages (or message pointers) are stored in four primary queue types in the LMB 710. First, individual queues or message boxes are provided, one for each subscribed customer, uniquely identified by a QIN which generally matches the customer PIN. The individual message boxes store all messages and associated MSG IDs that have been targeted to the customer profile associated with the corresponding PIN. This represents a "one-to-one" correspondence between message queues and individuals. Second, categorized queues are provided which contain messages targeted at customers which share one or more targeting parameters/characteristics (i.e., queues which hold messages for defined categories of customers). For example, there might be a queue for all females between the ages of 22 and 35. These queues can be defined dynamically (i.e., added, changed, removed) as campaign requirements dictate. These queues represent a "one-to-many" relationship between queue and end-users. Third, geographic queues are provided which are keyed by the ANI (Automatic Number Identifier), or telephone number, of the individual end-user who is placing a call. All messages and associated MSG IDs are stored that have been targeted for delivery within a given geographic area rather than to specific individual PINs and/or categorized PINs. Again, these queues represent a "one-to-many" relationship between queue and end-users. Fourth, a general queue is provided for messages which are not specifically targeted to individuals, categories of individuals or specified geographic areas (i.e., those intended for broad-based distribution to general audiences). These, again, represent a "one-to-many" relationship between queues and end-users.

It is noted that the system will support message boxes for different presentation formats. For example, the system may employ simple audio boxes (similar to voice mail) for delivery via standard telephones, and combined audio/visual/video boxes for delivery via screen phones or video phones.

Also, within each queue, the messages are sequenced or ordered based on timing, sequencing and/or grouping criteria embodied in the MSG IDs. It is noted that for a given queue, the LMB 710 will designate the next "hot" message (defined as a message which should be played first upon call initiation; i.e., before the called party is on the line in order to allow for cut-through, capture, etc.). All other "hot" messages are (normally) suppressed for the duration of the call (in other words, it provides the capability to ensure that only one message is in "hot" status at any given time). Having identified the governing "hot" message, the LMB 710 places any associated messages in the appropriate sequence. For example, if the hot message is "grouped" with another message, the grouped message comes next. (A detailed discussion of the MSG ID coding logic and LMB 710 message sequencing function is provided below.)

Because targeting to message boxes, and sequencing within messages boxes, is conducted "offline" (i.e., not during or in conjunction with a call being placed), response time (delivery of appropriate messages when a call is place) is significantly improved by minimizing processing requirements at the time that the call is placed.

Finally, the LMB 710 will place a fixed audio message consisting of a personalized greeting in each individual message box which will be played before all other queued messages when end-users access the system. This message (e.g., "Hello John, welcome . . . . One moment while I access your personal messages") will be played when the user first enters their PIN upon accessing the system.

The interactive voice response units (IVRUs) 720 control the flow of messages and information to and from the calling parties and the LMB 710. The IVRUs 720 locate the appropriate message to play based on a prioritized search process (i.e., sequentially checks one of four message queue types to locate next available message to play). In terms of message (or "script") location, the IVRU's 720 processing is limited to finding the first of four queue types with a playable message by hunting in a predefined fixed sequence (i.e., queue 1, then 2, then 3, then 4). This limits the processing needed at the time of call to ensure rapid response times. The LMB 710 has already properly sequenced the calls in the message queues based on logic embodied in the MSG IDs. This process is described in some detail below.

When an end-user accesses the system to place a call (i.e., by dialing 1-888-xxx xxxx), they will be asked to enter their assigned PIN. The call processing system simultaneously captures the telephone number of the phone from which the call is being placed through Automatic Number Identification (when available). The message delivery system/IVRU 718 then engages in a sequential process described next to locate the relevant message(s) to be played for the caller.

First, the system looks up the customer's individual message box by referencing the PIN. If a box corresponding to this PIN is found, the system checks to see if there are messages available in that queue for delivery. If so, those messages are played as long as they are available. If the PIN does not correspond to an individual message box residing on the system, the system verifies that the PIN entered corresponds to that of a subscribed customer by cross-referencing the master customer PIN file in the LMB. If the PIN is not identified, the caller is asked to re-enter the PIN. If no match is made, the customer is provided with subscription information and/or provided and opportunity to subscribe. If the caller chooses not to subscribe at that time, the caller is provided with an option to transfer to another access mechanism (e.g., operator assisted or automated collect or credit card calls) or to terminate the call. If the customer chooses to subscribe, the caller may place a call once subscription is complete by drawing either from the geographic or general queues as described below (i.e., the customer does not yet have an individual message box) if messages in those queues are available.

Second, after depleting messages resident in the subscriber's individual message box, or if the message box is empty, the IVRUs 720 check for messages in category queues keyed by the customer's PIN.

Third, if the customer is a subscriber but does not have an individual message box resident on the local delivery system or if the customer's individual message box and any relevant category boxes are out of messages, the system goes next to the geographic queue identified by the calling number or station. The system draws from this queue until the call is terminated or until the queue is depleted.

Fourth, once individual, category and geographic message queues have been exhausted (or are otherwise not available—this can occur, for example, if the individual message box is depleted, the PIN entered does not correspond to any category queues and the system is unable to capture the calling number because the call is being placed from an unrecognizable unit), the system draws from the general queue as long as messages are available or until the call is terminated.

This sequential search approach is important in ensuring that the most valuable messages (i.e., most highly targeted) are played first, and to ensure that the less targeted queues remain available for customers with fewer targeted messages in their individual messages boxes due to their particular profiles (i.e., there may be few campaigns targeting particular customer groups at any given time).

In the event that no messages are available in any of the queues, or if messages run out in all of the queues, the call may be terminated with relevant information and an appropriate greeting. Alternatively, the calling party may choose to be transferred to another access mechanism (e.g., to an operator or an automated service in order to place a collect or credit card call). The end-user will also have the option to reinitiate the call with their existing service provider by dialing direct. If the end-user chooses the underlying carrier as their primary service, the call can automatically be placed at the carrier's specified rates without having to reinitiate a connection. In other words, by selecting an option, the caller can be transferred to the carrier's 'billed' call system.

The control server (CS) 718 functions to relay information to the IVRUs 720, coordinate the timing of message delivery with the IVRUs 720 and provide for appropriate interfacing with the bridging switch 716. Either the CS 718 or IVRU 720 can clock a call to determine the appropriate time to interject a message. The CS 718 is typically standard equipment for INS bridging systems (for telephone mediums) and is presumed to be part of the telecommunications carrier's equipment.

The INS bridging switch (BS) 716 is part of the carrier's INS system. It's primary functions are to receive the call when the access code is dialed by the caller 712, identify the calling number, trigger a response from the IVRUs, bridge the call to the appropriate called party number of the call recipient 714, and bridge interjected messages into the call at specified intervals controlled by the CS 718 or IVRU 720 logic.

The call center (CC) 722 is an intermediate termination point for messages designed for "cut-through" functionality (i.e., after hearing the message, a caller may choose to be connected to a CC to obtain additional information or to place an order for the product advertised in the message). The CC number can be any predetermined number corresponding to a call center or other location (physical or logical) defined for this purpose. The appropriate CC number will be part of the script played by the IVRU 720 corresponding to the particular message. After interacting with the CC, the caller can resume the normal call sequence where the call was left off.

The MSG ID coding, which can take any number of forms, should ensure that timing, frequency and grouping requirements are met at the local delivery level. For example, the code structure might be in the format "FNNNNNG-TTTT-DDDDDD," described in detail below.

F: Distinguishes messages which must only be played as the very First message when an end-user initially access the system to place a call (i.e., those "hot" messages designed for "cut-through" functionality) from those which can be played at any time during a call (e.g., F=1 indicates "hot" message, F0 indicates not hot).

NNNNNG: N represents the message identifier (e.g., message Number 325978) and G designates Groupings (e.g., G=0 indicates no group; G=1 indicates first message of a group, G=2 indicates second message of a group, and so on).

TTTT: Indicates Timing parameters (in military time). For example, if a message is intended to be played between the hours of 5:00 pm (1700 hours) and 10:00 pm (2200 hours), then TTTT=1722; between 8:00 am and 8:00 pm, TTTT=0820, and so on. If no timing requirements exist, then TTTT=0000.

DDDDDD: Indicates from-to dates (in Julienne format) during which the message is intended to be played. For example, DDDDDD=001031 indicates that the message is to be played during the month of January.

To illustrate, the following messages, while they may be delivered to message boxes or queues in arbitrary order, would be arranged by the LMB 710 and played (read by the IVRU 720 or other interface unit) in the following sequence for a call placed on January 10th at 6:00 pm:

1-2034871-0000-005031, 0-2034872-0000-005031, 0-2034873-1721-001059, 0-4758690-1224-000000, 0-2159081-0000-000000, 0-2159082-0000-000000, etc.

This example also illustrates the LMB 710 logic to prioritize local sequencing based on hot/not-hot status as well as by time, date and grouping/sequencing requirements. Messages will be arranged first by hot/not-hot, then by any groupings associated with hot, then by date, then by time. Any message resident in the message box for which the date has elapsed will result in notification to the CM 816 for proper accounting. Once this has been noted, the message can either be purged, or if desired, updated with a new or extended campaign date.

Referring now to the flowcharts of FIGS. 10–14, a number of representative operational scenarios will now be described to illustrate various elements of the system dynamics.

Figure 10:
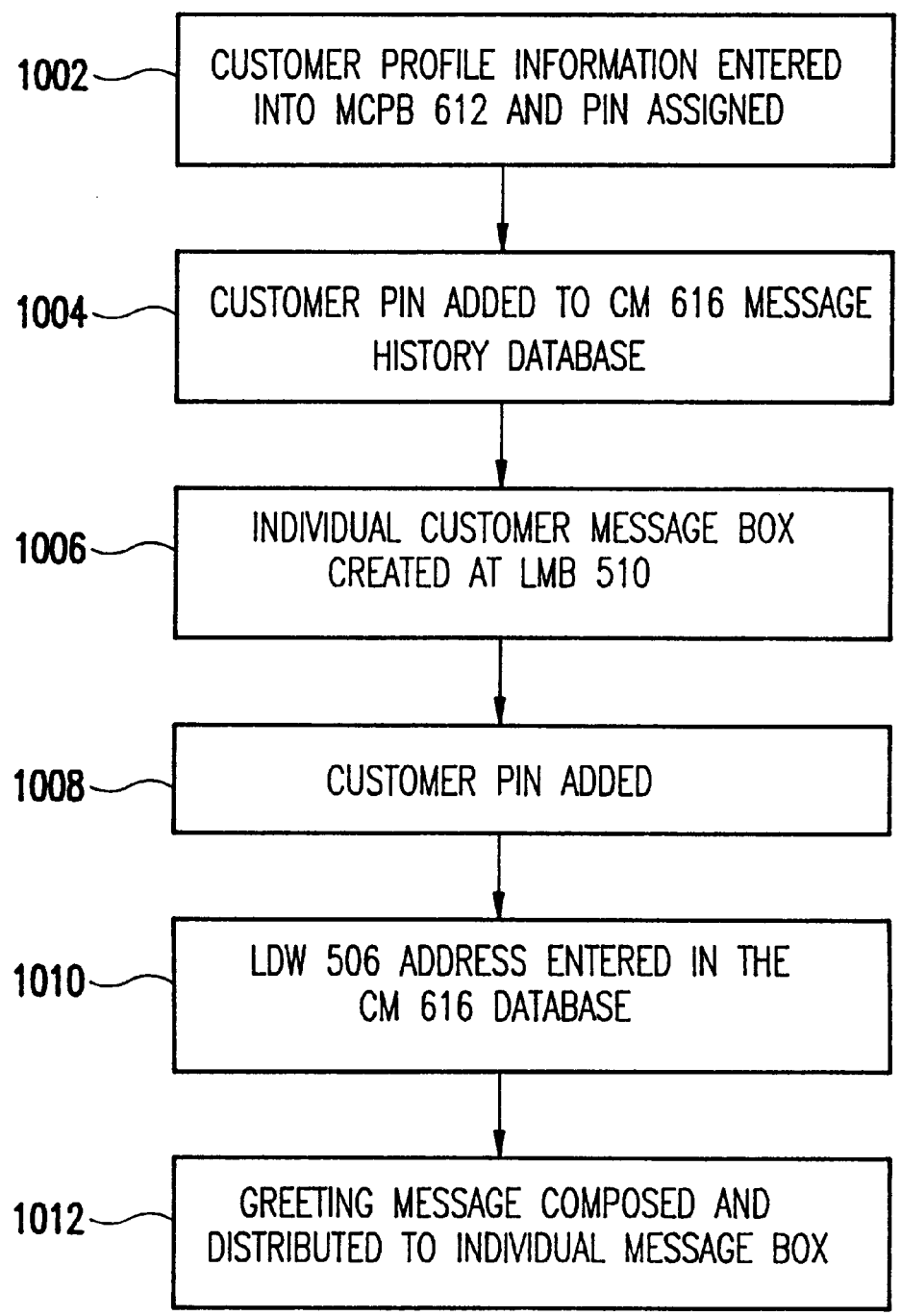
FIG. 10 is a flowchart describing a scenario in which a new customer is activated.

FIG. 10 describes a scenario in which a new customer is activated. Initially, customer profile information is entered into the MCPB 812 and a PIN is assigned (step 1002). Then, the customer PIN is added to CM 816 message history database for subsequent tracking (step 1004). Next, an individual customer message box is created at LMB 710 (step 1006), and customer PIN is added (step 1008) to any relevant category queues PIN lists. The LDW 706 address for the associated message box is entered in the CM 816 database (step 1010). Finally, a personalized greeting message is composed using customers' name, and distributed to the individual message box (step 1012). This message will be played each time customer accesses the system.

Figure 11:
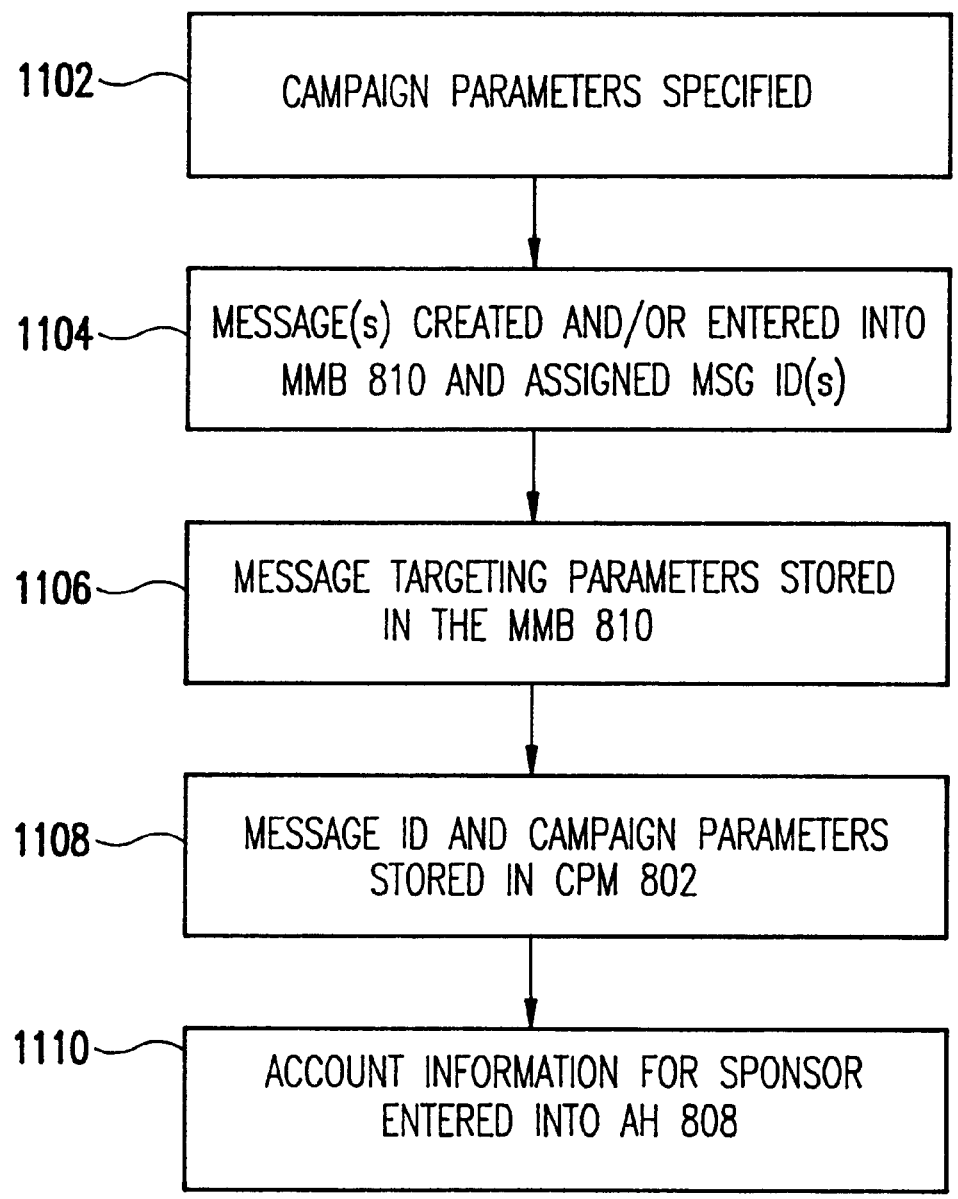
FIG. 11 is a flowchart describing a scenario in which a new media campaign is activated.

FIG. 11 describes a scenario in which a new media campaign is activated. First, campaign parameters are specified by the sponsor (step 1102). Then, message(s) are created and/or entered into the MMB 810, and assigned MSG ID(s) which uniquely identify message(s) and relevant dynamic characteristics (e.g., timing, sequencing, grouping—see MSG ID code logic) (step 1104). Specified message targeting parameters (for each message in the campaign) are then stored in the MMB 810 along with associated MSG ID(s) (step 1106). Next, MSG ID and campaign parameters are stored in CPM 802 for monitoring of ongoing campaigns (step 1108). Also, account information for the sponsor is entered into the AH 808 (e.g., contact information, transaction information) and, if the sponsor is a new sponsor, assigned an account code (step 1110).

Figure 12:
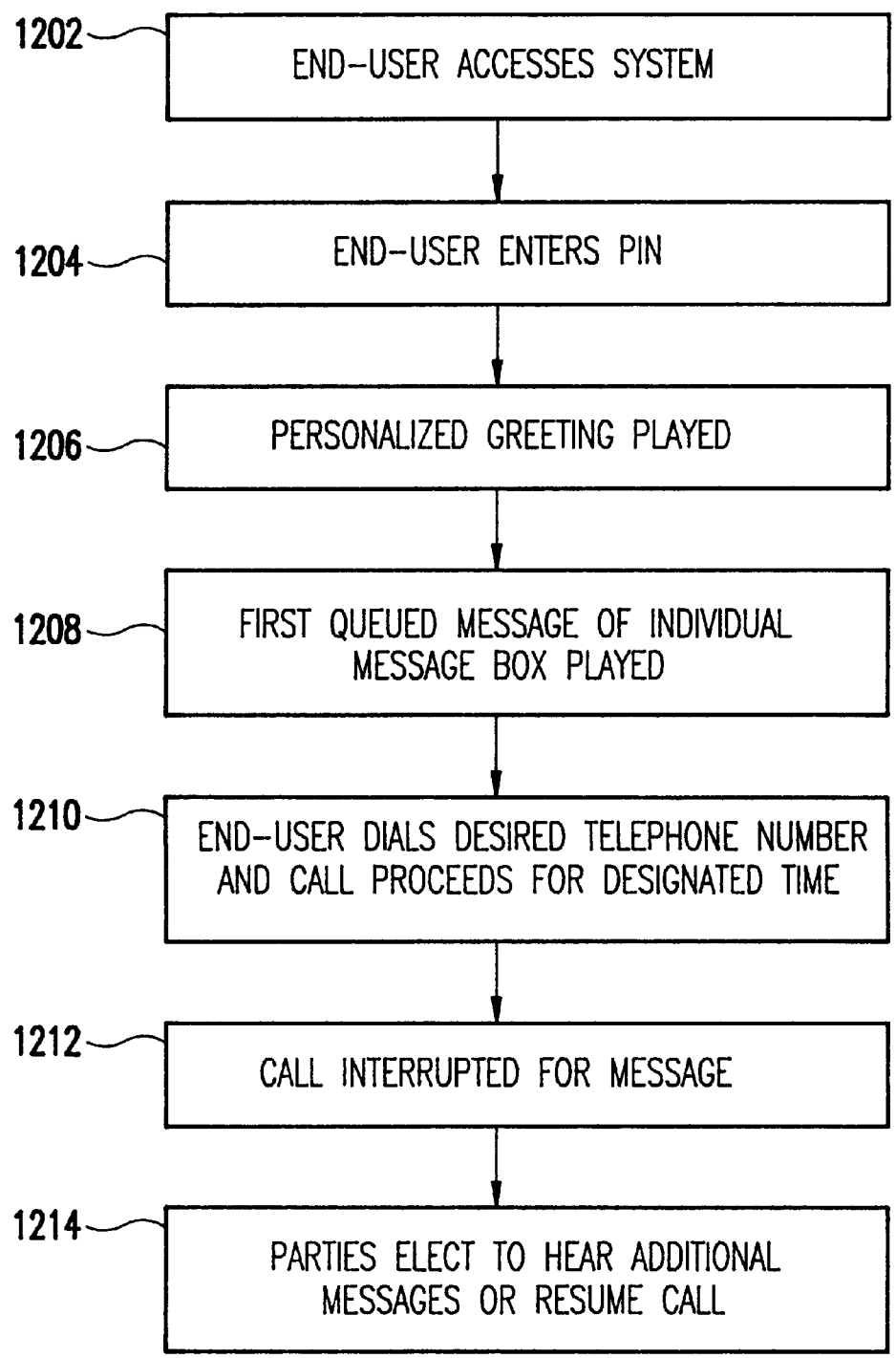
FIG. 12 is a flowchart illustrating an example of a subscribed end-user calling sequence.

FIG. 12 illustrates another example of a subscribed end-user calling sequence. First, the end-user accesses the system by dialing, for example, 1-888-XXXXXXX (step 1202). Next, the end-user is prompted for and enters his or her PIN (step 1204). The system automatically responds with a personalized greeting based on a pre-loaded (at time of registration) sound clip (e.g., 'Hello John, thank you for calling. One moment please while I access your personal messages") (step 1206). The system then checks the individual message box associated with the PIN, and assuming a non-empty box is found, plays first queued message (step 1208). It is noted that the end-user may elect to listen to additional message(s) to earn more free communications time, or may place call by dialing desired number. Also, the desired number may also be dialed before first message is played, but the call would not be initiated until after first message sequence. Next, the end-user, after having heard/interacted with message(s), dials desired telephone number (if not already dialed) and proceeds with call, speaking uninterrupted for designated period of time (e.g., two free minutes for every message heard) (step 1210). The duration of this time will depend on number of messages/length of messages played before placing call. The system can be configured so that both calling and called parties hear the same message, or so that each hears a different message.

After the designated period of free communications time, the call is interrupted for brief message which is heard by both calling and called parties (step 1212). After listening to the sponsored message, the calling and called parties may elect to hear additional messages (thereby lengthening period of free communications to follow), or may resume the call, and the process continues with periodic message interjections (step 1214). The system sequentially checks each message queue as described above from which to draw subsequent messages during the call (i.e., personal message queue, category queue, geographic queue and general queue). The PIN and/or ANI of the calling party governs selection of queues.

Figure 13A:
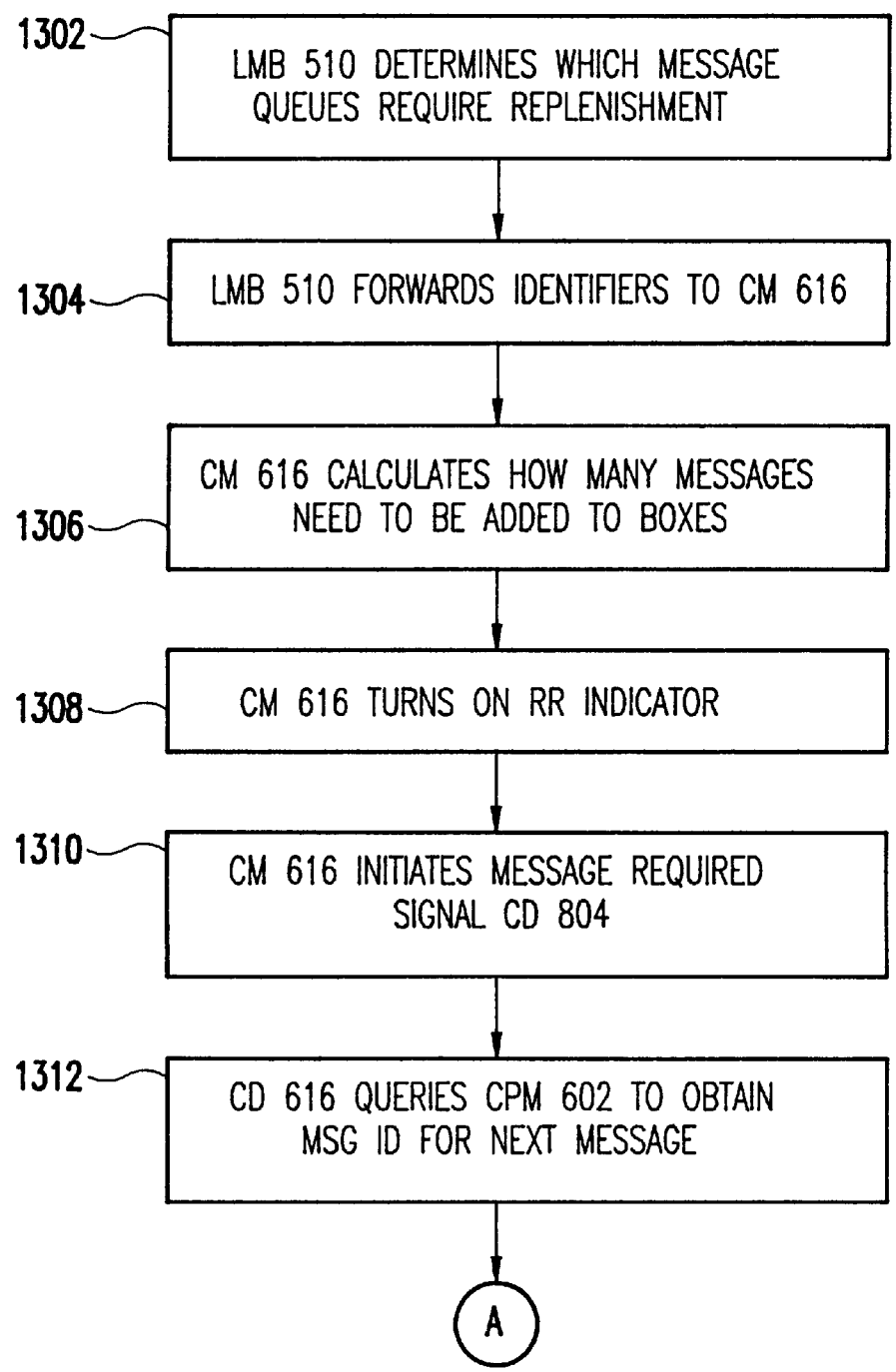
FIGS. 13(a)–13(c) are flowcharts illustrating a forward message replenishment cycle.
Figure 13B:
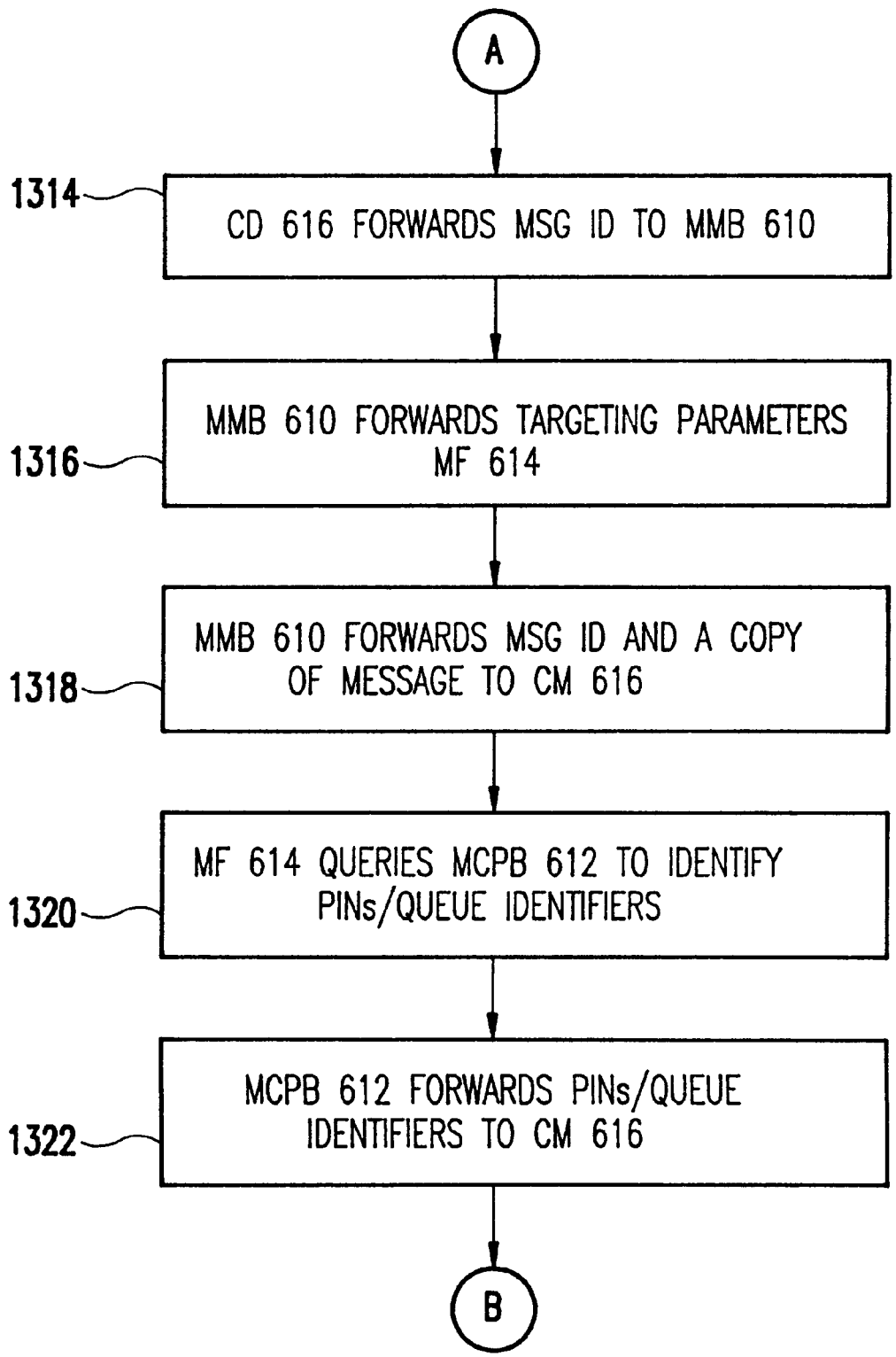
Figure 13C:
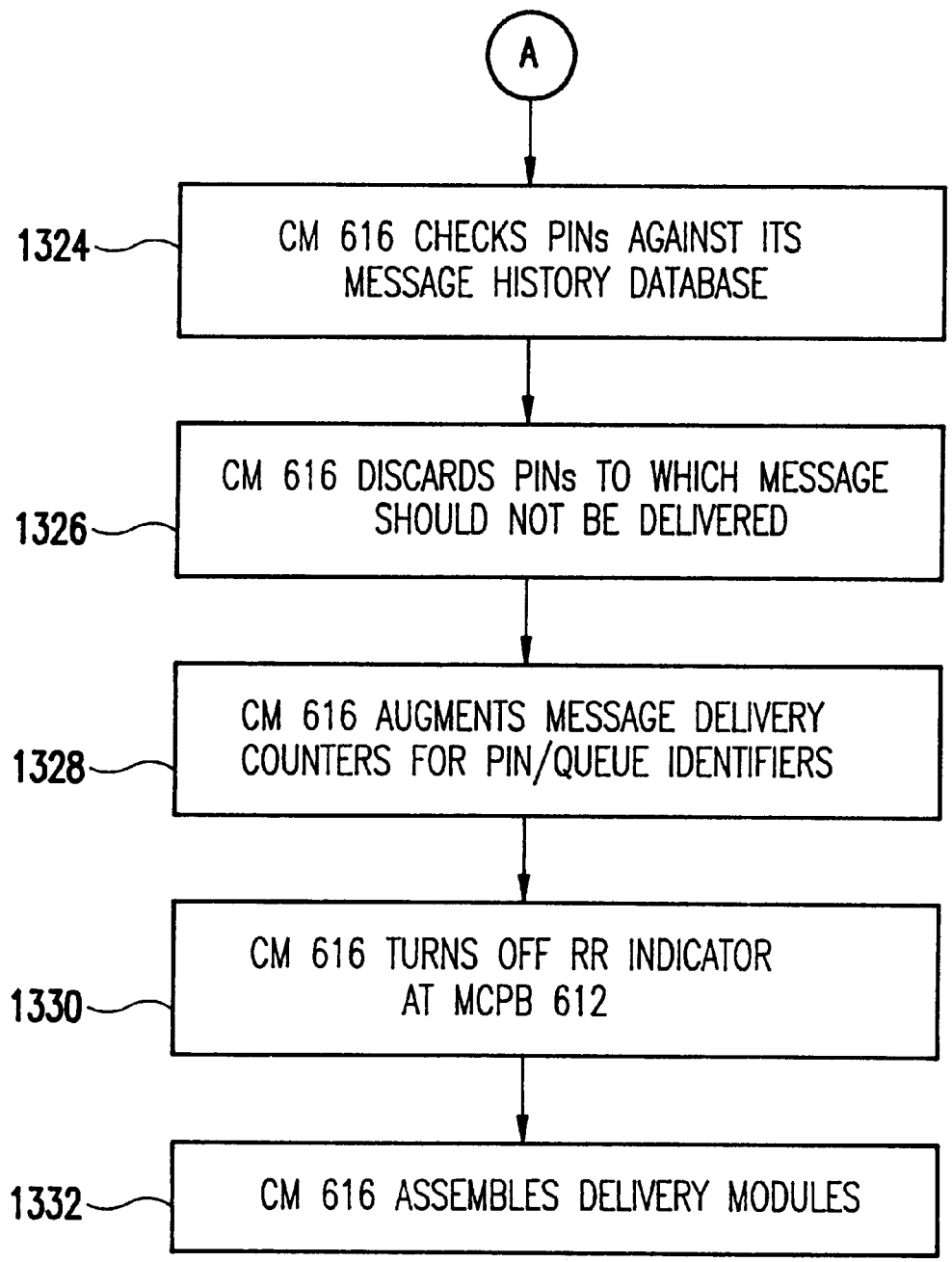

FIGS. 13(a)–13(c) illustrates a forward message replenishment cycle. At specified times, the LMB 710 determines which message queues require replenishment by determining which queues have dropped below the specified EOQ levels (step 1302). For example, individual message boxes may be defined as "full" when they have 100 queued messages. If they drop below a defined threshold (e.g., 50 queued messages), the system indicates that the box is in need of replenishment. It is noted that the system automatically knows how many messages to add to the corresponding queue (e.g., 50 messages in this example). The LMB 710 then forwards identifiers for all message boxes in need of replenishment to the CM through the LDW 710 (step 1304). The CM 616 records the associated message box identifiers, and automatically calculates how many messages need to be added to these boxes based on the designated EOQs (step 1306). The CM 816 then turns on the RR indicator for each identified message box at the MCPB 812 (step 1108). The CM 816 next initiates a message required signal to CD 804 (step 1110). The CD 816 queries the CPM 802 to obtain the MSG ID for the next message to be distributed (based on campaign parameters and current campaign status's) (step 1312). The CD 816 then forwards the corresponding MSG ID to the MMB 810 (step 1314). The MMB 810 forwards targeting parameters for the associated MSG ID to the MF 814 (step 1316), and forwards the MSG ID and a copy of the message to the CM 816 for subsequent distribution (step 1318). The MF 814 then queries the MCPB 812 (step 1320) to identify corresponding PINs/QINs that are in a 'Replenishment Required" state as indicated by RR indicators that have been turned on by the CM 816. The MCPB 812 forwards all relevant PINs/QINs to the CM 816 (step 1322). The CM 816 checks PINs against its message history database to enforce dynamic campaign requirements (described above) (step 1324), and discards PINs to which message should not be delivered (step 1326). The CM 816 augments message delivery counters for each PIN/queue identifiers receiving a message (step 1328), and when queues have been replenished, turns off the RR indicator at the MCPB 812 (step 1330). Finally, the CM 816 assembles delivery modules as described above (step 1332).

Figure 14:
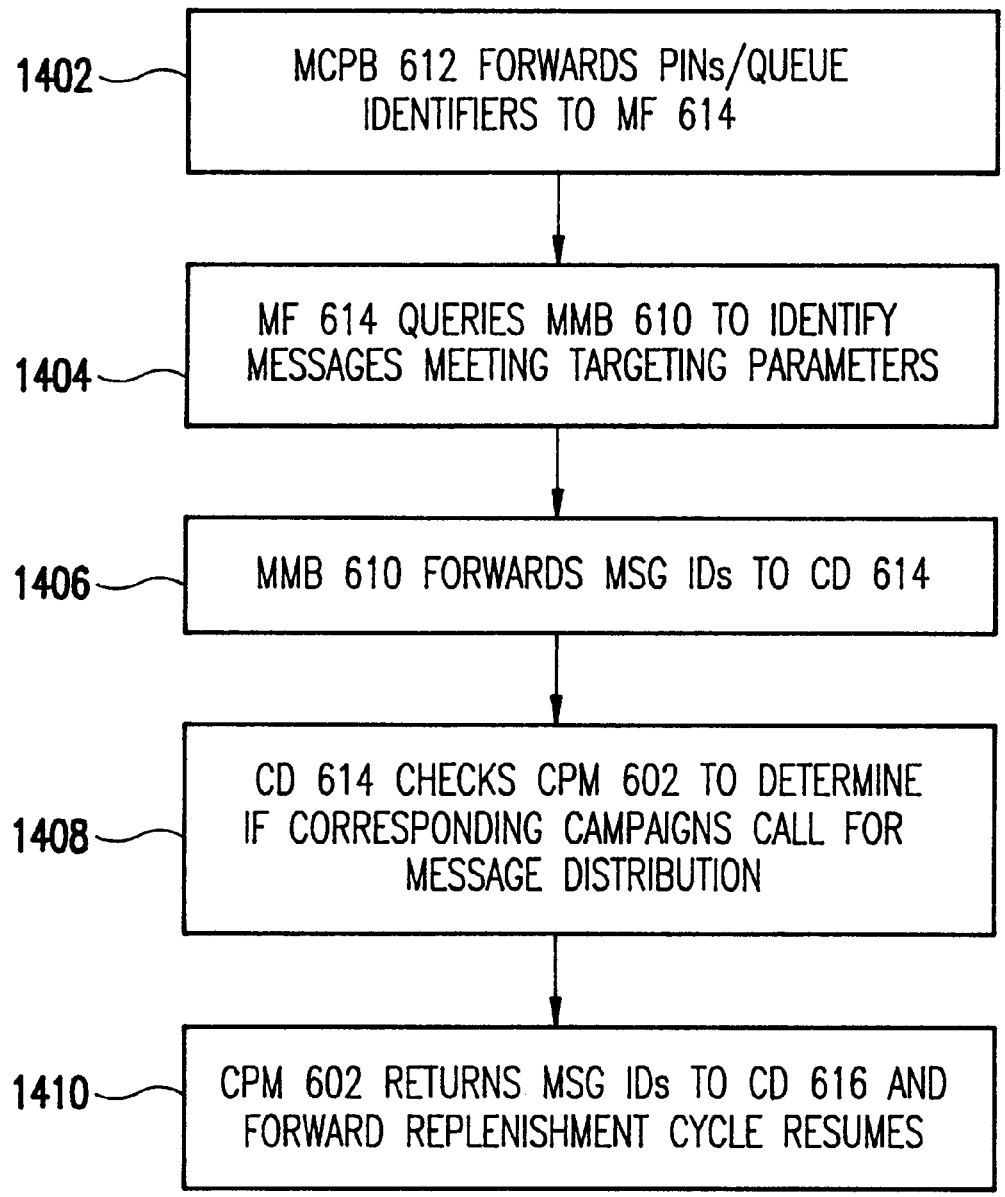
FIG. 14 is a flowchart illustrating a reverse message replenishment cycle.

FIG. 14 illustrates the reverse message replenishment cycle. If RR indicators remain on for a specified period of time after the forward replenishment cycle was initiated, the MCPB 812 forwards PINs/QINs for those queues that have persisted in a RR status to the MF 814 (step 1402). The MF 814 then queries the MMB 810 to identify messages that meet targeting parameters associated with message boxes that have remained in a RR status (step 1404). The MMB 810 in response forwards any identified MSG IDs to the CD 814 (step 1406). The CD 814 then checks with the CPM 802 to determine if corresponding campaigns call for message distribution (step 1408). The CPM 802 next returns MSG IDs for campaigns calling for message distribution back to CD 816 where the forward replenishment cycle then resumes with these MSG IDs (step 1410).

Various features and advantages of the preferred embodiment described above will now be discussed.

The embodiment uses uniquely identified message boxes, one for each subscribed customer, for delivery of precision targeted messages based on individual customer profiles. This use of individual boxes maximizes targeting precision while greatly simplifying targeting and message distribution processes by allowing targeting logic and message distribution to occur during off-peak periods. This reduces processing which must occur at the time that a call is placed.

In contrast, an alternative approach might be to match a customer's profile to relevant messages at the time that a call is placed (i.e., PIN entered). This would require significantly more processing at the time of the call which would either introduce additional delay (as the system would have to spend more time finding appropriate messages), require increased processing power (to speed the message retrieval process), and/or require increased communications between the local message server/call processor and the database of available messages.

The preferred embodiment also uses multiple queue types (e.g., individual, category, geographic and general) with pre-arranged messages, with a simple fixed search routine conducted by the local message server/call processor at the time of a call. Pre-arrangement of messages further simplifies and accelerates the message retrieval process by eliminating significant processing requirements at the time of a call. The messages will have been delivered to the appropriate queues, and ordered/sequenced for delivery within each queue before a call is actually made. This allows the local message server/call processor to simply play the next message in line without having to manipulate the ordering of messages in the queue.

The simple, fixed search process provides additional simplicity in retrieving appropriate messages to play at the time of a call. The local message server/call processor simply checks each queue in turn, playing the next available message in each queue until messages are no longer available, then advances to the next queue in the search sequence.

In a preferred embodiment, the multiple queue types (e.g., individual, category, geographic and general) are used with a hierarchical message search process from most targeted to least targeted queues. Use of a queue hierarchy simplifies the process of message retrieval further, while ensuring that the system automatically retrieves messages with the greatest degree of targeting first. By searching in a hierarchical sequence from the most targeted to least targeted queues, the system will exhaust all available targeted messages before pulling messages from lesser targeted queues. This produces two important results. First, the local message server can quickly locate the most targeted messages without expending time to process and prioritize queued messages based on their degree of targeting. Second, the hierarchical search process minimizes the playing of lesser targeted messages. This is important in minimizing the probability that callers will encounter empty message queues when attempting to access the system. Since there will most likely be periods of time in which targeted messages are not available for customers having certain profiles (e.g., there may be a lack of sponsors attempting to reach a given group of customers sharing common profile characteristics), this design feature essentially acts as "insurance" to smooth out periods in which these customers might otherwise encounter empty message queues. To the extent that some customer demo-graphics may never be explicitly targeted by the advertisers using the system, this capability essentially provides a subsidy from those frequently targeted to those that are infrequently targeted. This is important in promoting universal access to communications (i.e., one would not want to preclude some customers from using the system because of undesirable (from the sponsors' perspective) profile characteristics).

The preferred embodiment is configured to perform message targeting and distribution/association 'off-fine' (i.e., independent of calls being placed). The targeting and distribution process may be accomplished through centralized and/or distributed processing when computing resources are most plentiful. Together with the use of multiple queue types and the message association coding logic, this configuration enables maximum functionality (targeting precision, delivery specifications, reporting) at minimum cost by minimizing processing requirements at the time that calls are placed. The configuration also enhances overall system performance (response times, throughput) while at the same time providing scalability. It provides a mechanism to ensure that sufficient messages have been associated with each subscriber and/or generalized queue to support observed usage patterns.

Also, the preferred embodiment's use of a logically centralized message bank/database maximizes targeting flexibility while simplifying control of message targeting. That is, use of a logically centralized message bank increases targeting flexibility by allowing message distribution to be controlled from a central vantage point. From this central vantage point, messages can be designated for delivery to specified local areas/geographies, without replicating the process of message production and distribution. If for example, a sponsored message is intended to be distributed in both Philadelphia and San Francisco areas, the central message banks allows the messages to be delivered to the appropriate queues, without having to produce and load messages for two separate message banks (i.e., distribution to specified geographies is simply part of the targeting process). The replication process occurs automatically and under control of a central monitor to simplify accounting and control of message distribution. It is noted that the central facilities, or any portion thereof, may be distributed (e.g., through replication) to any number of localized sites. This can be done to permit message targeting and distribution processes to occur independently at any such localized site. Physical distribution of such processes can enhance the efficiency of the targeting and distribution of messages because, for example, at each localized site, the system would only have to search those profiles supported by the local site to determine appropriate queues for message delivery. Logical centralization enables the system to capitalize on the efficiencies of physically distributed processes while ensuring coordination and control through centralized monitoring. In short, having been designed to support centralized operation and control, the system has the flexibility to capitalize on the benefits of both centralized and distributed processing.

In contrast, an alternative approach might be to independently load the messages at databases/servers serving each location. Not only does this add complexity to the message production and distribution process, but it also increasing the complexity of message delivery accounting. If messages were independently loaded at two or more locations, the system would have to reconcile statistics and information regarding message distribution in order to compile overall campaign statistics. The system of the preferred embodiment ensures that all messages distributed are accounted for regardless of their intended targeting or distribution destinations (i.e., single point of control for monitoring purposes).

Moreover, logical centralization of customer profile information as in the preferred embodiment simplifies targeting and message distribution, and enhances message delivery monitoring and fault isolation. That is, centralization of customer profile information, as well as 'replenishment required' information, facilitates accounting of which queues are in need of messages at any given time, and enhances the probability that messages can be found to replenish the queues by drawing on centrally available campaign information and message banks (i.e., by aggregating messages in a central message bank, the system essentially takes advantage of scale/aggregation to enhance likelihood of message availability). Distributed customer profile information would require far more complex processing and more intensive communications to locate appropriate messages to replenish queues, and it would be more difficult to know which queues required replenishment at any given time. Centralization of profile information and 'replenishment requirements' also reduces the likelihood that messages will be sent to already filled queues. In the embodiment, the central point of control for determining which messages boxes receive messages and in what quantities, reduces the chances of errors.

Additionally, the use of centralized customer profile information simplifies the customer activation/registration process while reducing the probability of erroneous entries (e.g., duplicates, inaccurate profiles, etc.), by allowing for centralized input/output and 'quality assurance/monitoring' of profile information. Customer profiles can periodically be gauged against independent sources of information. While this could be done with a decentralized model, the process would be far more complex and communications intensive. Finally, centralization of customer profiles facilitates analysis and reporting of customer profile information, and makes it easier to generate lists of customers sharing specified profile characteristics.

Centralized monitoring of message deliveries as in the preferred embodiment improves the reliability of accounting for message distributions while simplifying the process of compiling information for reporting purposes. The use of EOQ to control message replenishment and inventory levels within each virtual queue is integral to the off-line targeting and distribution/association processes. In this regard, a queue's inventory level refers to its number of active message associations. EOQ levels are established for each queue based on usage patterns to ensure that queue capacities are optimized for performance and cost. Associating 100 messages with an individual who consumes 5 messages per week, for example, would make inefficient use of system resources. Also, use of economic order quantities (EOQ) in the distribution of messages to message queues simplifies the process of delivering the right quantity of messages to the right place at the right time, with minimal risk of error and lack of distribution accountability.

That is, the use of EOQ for replenishment ensures that messages are delivered only to those queues in need of additional messages, which reduces processing requirements (and costs) while enhancing medium accountability and control. When a replenishment order is triggered for a specific queue based on its EOQ and inventory level, the system knows precisely how many messages are needed to fully replenish the queue. Used in conjunction with the forward and reverse queue replenishment cycles (off-line processes), this configuration also maximizes the total throughput of messages delivered while ensuring that all queues in need of messages are adequately replenished.

While EOQ's can be established independently for each queue, in practice queues may instead be categorized by usage levels to streamline resource and processing requirements further. Continuing with the previous example, the system object representing the specific individual would be characterized as a "low volume" user. This characterization might then translate into a queue size of 20 messages with an EOQ level of 10 messages. When the number of messages associated with the corresponding individual object falls to 10, the object will undergo a state transition indicating that it is in a "replenishment required" status. The system will then seek to establish ten new associations between the object representing the individual and messages available from among active campaigns through the forward and/or reverse replenishment processes.

The preferred embodiment's use of personalized greetings played each time an end-user accesses the system and enters their PIN enhances the perceived personalization of messages from the end-user's point of view. Further, real-time campaign updates allow sponsors to change the content, targeting parameters and/or dynamic campaign parameters (timing, sequencing, etc.) in mid-course (i.e., allows sponsors to make adjustments throughout the course of a campaign).

Moreover, the forward and reverse replenishment cycles of the preferred embodiment are designed to deliver the maximum number of messages to appropriate message queues with minimal processing. The replenishment cycles are essentially mechanistic, allowing the system to easily and reliably push and/or pull messages to queues in need of messages. Also, the sophisticated MSG ID code logic of the preferred embodiment allows the system to support complex timing, sequencing and grouping parameters with minimal processing at the time a call is placed. The coding logic allows the LMB 710 to arrange messages in the desired sequence pro actively.

In other words, the use of forward and reverse replenishment cycles for message distribution ensures that the maximum number of messages in need of delivery are distributed to appropriate queues, and that the maximum number of queues in need of messages are replenished. Together, these replenishment processes maximize message throughput, improve service reliability and availability, and enhance medium accountability and control.

In the forward cycle, messages are designated for delivery based on campaign requirements. The system then seeks appropriate queues based on specified targeting parameters and establishes associations with those queues in need of replenishment (i.e., those for which the inventory level has dropped below the established EOQ level triggering a replenishment order).

The reverse replenishment cycle is triggered automatically upon completion of the forward replenishment process. Upon completion of the forward process, queues that are still in need of messages (i.e., EOQ has triggered a replenishment order and the queue has not yet been refilled to capacity) effectively request additional messages. Based on the parameters associated with the requesting queue(s), the system seeks appropriate messages from among the active campaigns. As previously mentioned, the reverse replenishment cycle may be triggered through intervention at any time either manually or in response to established parameters.

And finally, the closed loop feedback system for delivery of messages and receipt of queue replenishment indicators (together with the EOQ replenishment process) provides visibility into message distribution statistics while ensuring medium accountability (i.e., guarding against lost or misrouted messages) and simplifying queue replenishment.

It is noted that other types of generalized or "many-to-one" queues might be employed. For example, according to another aspect of the invention, a usage-based queue is included in the system. The usage-based queue includes a number of different queues associated with different levels of subscriber usage. For example, the levels of usage may simply represent the number of times a subscriber accesses the system. As another example, the levels of usage may be indicative of the number of times a subscriber elects to hear another message, or the number of times a subscriber elects to interact with messages. In the case where separate usage queues are provided, each having its own QIN, the system tracks the usage of each subscriber and sets the value of a dynamic pointer resident, for example, in the individual queues of the subscriber. The pointer value is used to key the appropriate usage queue QIN. Alternately, the usage queues can be implemented using the individual queues as described above in connection with FIG. 4.

Yet another aspect of the invention is directed to embedding logic in the PIN of the calling subscribed party, with the logic being used to key the appropriate message queue. For example, the PIN may be comprised of 14 digits, i.e., the 10 digit phone number of the subscriber and an additional 4 digits A, B, C and D. In this case, A may represent gender, B an age range, C an income level, and D a free radical. This scheme provides a means to directly access a number of different category-type queues associated with different combinations of A–D, thus bypassing, or eliminating the need for, individual queues. Logic embedded PINs could also be used as a failsafe mode in the case where the system suffers a failure in the distribution of individual messages. Also, in addition too, or in place of, the use of logic A–D to key the queues, category-type queues may be keyed by various external factors identified by the system, such as time of day or season.

The present invention has been described by way of specific exemplary embodiments, and the many features and advantages of the present invention are apparent from the written description. Thus, it is intended that the appended claims cover all such features and advantages of the invention. Further, since numerous modifications and changes will readily occur to those skilled in the art, it is not desired to limit the invention to the exact construction and operation as illustrated and described. Hence all suitable modifications and equivalents may be resorted to as falling with the scope of the invention.

What is claimed is:

1. A communications system for delivering promotional messages to subscribed calling parties, comprising:

a message bank which stores the promotional messages at respective message bank addresses thereof;

an association processor for comparing preset targeting criteria of each promotional message with profile data of each subscribed calling party to obtain data associating each subscribed calling party with a plurality of said promotional messages;

a message queue having a plurality of electronic queues, each of said electronic queues assigned to a respective one of said subscribed calling parties and storing data indicative of respective message bank addresses of each of the promotional messages associated with an assigned one of said subscribed calling parties by said association processor; and, a call processor for accessing an electronic queue assigned to a calling party and delivering to at least the calling party a promotional message stored in said message bank at a message bank address indicated by the data contained in the accessed electronic queue.

2. A communications system as claimed in claim 1, wherein said plurality of electronic queues include a plurality of individual electronic queues which are respectively identifiable by unique queue identification numbers respectively corresponding to unique calling party personal identification numbers.

3. A communications system as claimed in claim 2, further comprising a customer profile bank for storing said profile data.

4. A communications system as claimed in claim 3, wherein each of said plurality of electronic queues contains plural queue storage positions for storing plural data indicative of a respective plurality of message bank addresses of a plurality of promotional messages.

5. A communications system as claimed in claim 4, further comprising means for presorting the plural data according to coding logic received from an external source, wherein said plural data are retrieved from the queue storage positions based on an order resulting from said presorting.

6. A communications system as claimed in claim 2, wherein said call processor receives a personal identification number input by a calling party and retrieves and outputs to the calling party a promotional message indicated by the data contained in a one of said plurality of individual queues as identified by the queue identification number corresponding to the received personal identification number.

7. A communications system as claimed in claim 1, wherein said plurality of electronic queues include multiple types of queues having differing message targeting precision levels, and wherein said call processor receives a personal identification number input by a calling party and retrieves and outputs to the calling party a promotional message indicated by the data contained in a one of said plurality of electronic queues having a highest targeting precision level.

8. A communications system for delivering promotional messages to subscribed calling parties, comprising:

an association processor for comparing preset targeting criteria of each promotional message with profile data of each subscribed calling party to obtain data associating each of the promotional messages with at least one subscribed calling party;

a message queue having a plurality of electronic queues, each of said electronic queues assigned to at least one subscribed calling party and storing the data associating each of the promotional messages with at least one subscribed calling party; and, a call processor for accessing an electronic queue assigned to a calling party and delivering to at least the calling party a promotional message according to the data contained in the accessed electronic queue;

wherein said plurality of electronic queues include a plurality of individual electronic queues which are respectively identifiable by unique queue identification numbers respectively corresponding to unique calling party personal identification numbers;

wherein said communications system further comprises a message bank for storing data indicative of said promotional messages, and a customer profile bank for storing said profile data;

wherein each of said plurality of electronic queues contains plural queue storage positions for storing plural data indicative of a respective plurality of promotional messages; and wherein said communications system further comprises means for replenishing said electronic queues when a number of promotional messages indicated by the data stored therein falls below a preset queue level.

9. A communications system for delivering promotional messages to subscribed calling parties, comprising:

an association processor for comparing preset targeting criteria of each promotional message with profile data of each subscribed calling party to obtain data associating each of the promotional messages with at least one subscribed calling party;

a message queue having a plurality of electronic queues, each of said electronic queues assigned to at least one subscribed calling party and storing the data associating each of the promotional messages with at least one subscribed calling party; and, a call processor for accessing an electronic queue assigned to a calling party and delivering to at least the calling party a promotional message according to the data contained in the accessed electronic queue;

wherein said plurality of electronic queues include a plurality of individual electronic queues which are respectively identifiable by unique queue identification numbers respectively corresponding to unique calling party personal identification numbers;

wherein said communications system further comprises a message bank for storing data indicative of said promotional messages, and a customer profile bank for storing said profile data;

wherein each of said plurality of electronic queues contains plural queue storage positions for storing plural data indicative of a respective plurality of promotional messages;

wherein said communications system further comprises means for presorting the plural data according to coding logic received from an external source, wherein said plural data are retrieved from the queue storage positions based on an order resulting from said presorting; and wherein said communications system further comprises means for replenishing said electronic queues when a number of promotional messages indicated by the data stored therein falls below a preset queue level.

10. A communications system for delivering promotional messages to subscribed calling parties, comprising:

an association processor for comparing preset targeting criteria of each promotional message with profile data of each subscribed calling party to obtain data associating each of the promotional messages with at least one subscribed calling party;

a message queue having a plurality of electronic queues, each of said electronic queues assigned to at least one subscribed calling party and storing the data associating each of the promotional messages with at least one subscribed calling party; and, a call processor for accessing an electronic queue assigned to a calling party and delivering to at least the calling party a promotional message according to the data contained in the accessed electronic queue;

wherein said plurality of electronic queues include multiple types of queues having differing message targeting precision levels, and wherein said call processor receives a personal identification number from a calling party and retrieves and outputs to the calling party a promotional message indicated by the data contained in a one of said plurality of electronic queues having a highest targeting precision level; and wherein said multiple queue types in include individual queues provided for each subscribed calling party which are each identified by a respectively unique queue identification number corresponding to a unique calling party identification number, and group queues provided for groups of subscribed calling parties, wherein the individual queues have a higher message targeting precision level than the group queues.

11. A communications system as claimed in claim 10, wherein said group queues include at least one of categorized queues, geographic queues, usage queues and a general queue, each of said categorized queues associated with groups of subscribed calling parties having overlapping targeting parameters, each of said geographic queues associated with groups of subscribed calling parties of predetermined geographic areas, each of said usage queues associated with differing levels of calling party usage, and said general queue associated with all or a random subset of the subscribed calling parties.

12. A communications system for delivering promotional messages to calling parties, comprising:

message bank which stores the promotional messages at respective message bank addresses thereof;

a plurality of electronic queues which are respectively identifiable by unique queue identification numbers corresponding to unique calling party personal identification numbers, each of said electronic queues for storing data indicative of the message bank addresses of each of a plurality of promotional messages associated with a corresponding calling party personal identification number; and, an interface unit which receives a personal identification number input by a calling party and retrieves the data indicative of a message bank address from a one of said plurality of electronic queues corresponding to the received personal identification number, and which retrieves and outputs to the calling party a promotional message stored in said message bank at the message bank address indicated by the retrieved data.

13. A communications system as claimed in claim 12, further comprising a control server which relays information back and forth between said interface unit and an external telephone switching unit, the external telephone switching unit connecting the calling party to a called party.

14. A communications system as claimed in claim 12, further comprising a distribution module which receives and stores data indicative of promotional messages from an external source, and which inserts the data indicative of the message bank addresses of the promotional messages in designated ones of said electronic queues.

15. A communications system as claimed in claim 12, wherein each of said plurality of electronic queues contains plural queue storage positions for storing plural data indicative of a respective plurality of message bank addresses of a plurality of promotional messages.

16. A communications system as claimed in claim 15, further comprising means for presorting the plural data according to coding logic received from the external source, wherein said plural data are retrieved from the queue storage positions based on an order resulting from said presorting.

17. A communications system for delivering promotional messages to calling parties, comprising:

a plurality of electronic queues which are respectively identifiable by unique queue identification numbers corresponding to unique calling party personal identification numbers, each of said electronic queues for storing data indicative of at least one promotional message; and, an interface unit which receives a personal identification number from a calling partly and retrieves and outputs to the calling party a promotional message indicated by the data contained in a one of said plurality of electronic queues indicated by queue identification number corresponding to the received personal identification number;

wherein each of said plurality of electronic queues contains plural queue storage positions for storing plural data indicative of a respective plurality of promotional messages; and wherein said communications systems further comprises means for replenishing said electronic queues when a number of promotional messages indicated by the data stored therein falls below a preset queue level.

18. A communications system for delivering promotional messages to calling parties, comprising:

a plurality of electronic queues which are respectively identifiable by unique queue identification numbers corresponding to unique calling party personal identification numbers, each of said electronic queues for storing data indicative of at least one promotional message; and, an interface unit which receives a personal identification number from a calling party and retrieves and outputs to the calling party a promotional message indicated by the data contained in a one of said plurality of electronic queues indicated by queue identification number corresponding to the received personal identification number;

wherein each of said plurality of electronic queues contains plural queue storage positions for storing plural data indicative of a respective plurality of promotional messages;

wherein said communications system further comprises means for presorting the plural data according to coding logic received from the external source, wherein said plural data are retrieved from the queue storage positions based on an order resulting from said presorting; and wherein said communications systems further comprises means for replenishing said electronic queues when a number of promotional messages indicated by the data stored therein falls below a preset queue level.

19. A communications system for delivering promotional messages to calling parties, comprising:

a local message bank which stores the promotional messages at respective message bank addresses thereof;

a message queue having a plurality of electronic queues, each of said electronic queues identifiable by unique queue identification numbers and for storing data indicative of a plurality of message bank addresses of a respective plurality of promotional messages stored in said message bank, each of the queue identification numbers corresponding at least one of a calling party personal identification number and a calling parting origination number, said plurality of electronic queues including multiple types of queues having differing message targeting precision levels;

an interface unit which receives at least one of a personal identification number and an origination number of a calling party to obtain a corresponding queue identification number, and which retrieves and outputs to the calling party a promotional message stored in the message bank at a message bank address indicated by the data contained in a one of said plurality of electronic queues having a highest targeting precision level and identified by the corresponding queue identification number.

20. A communications system as claimed in claim 19, further comprising a control server which relays information back and forth between said interface unit and an external telephone switching unit, the external telephone switching unit connecting the calling and called parties.

21. A communications system as claimed in claim 19, further comprising a distribution module which receives and stores data indicative of promotional messages from an external source, and which inserts the data indicative of the message bank addresses of the promotional messages in designated ones of said electronic queues.

22. A communications system for delivering promotional messages to calling parties, comprising:
   a local message bank having a plurality of electronic queues for storing data indicative of promotional messages therein and identifiable by queue identification numbers, each of the queue identification numbers corresponding at least one of calling party personal identification numbers and calling parting origination numbers, said plurality of electronic queues including multiple types of queues having differing message targeting precision levels;
   an interface unit which receives at least one of a personal identification number and an origination number from a calling party and retrieves and outputs to the calling party a promotional message indicated by the data contained in a one of said plurality of electronic queues having a highest targeting precision level as identified by queue identification number corresponding to the received at least one of the personal identification number and the origination number;
   wherein said multiple queue types include individual queues provided for each subscribed calling party which are each identified by a respectively unique queue identification number corresponding to a unique calling party identification number, and group queues provided for groups of subscribed calling parties, wherein the individual queues have a higher message targeting precision than the group queues.

23. A communications system as claimed in claim 22, wherein said group queues include at least one of categorized queues, geographic queues, usage queues and a general queue, each of said categorized queues associated with groups of subscribed calling parties having overlapping targeting parameters, each of said geographic queues associated with groups of subscribed calling parties of predetermined geographic areas, each of said usage queues associated with differing level of calling party usage, and said general queue associated with all or a random subset of the subscribed calling parties.

24. A communications system as claimed in claim 19, wherein each of said plurality of electronic queues contains plural queue storage positions for storing plural data indicative of a respective plurality of message bank address of a plurality of promotional messages.

25. A communications system as claimed in claim 24, further comprising means for presorting the plural data according to coding logic received from the external source, wherein said plural data are retrieved from the queue storage positions based on an order resulting from said presorting.

26. A telecommunications system for delivering promotional messages to calling parties, comprising:
   a local message bank having a plurality of electronic queues for storing data indicative of promotional messages therein and identifiable by queue identification numbers, each of the queue identification numbers corresponding at least one of calling party personal identification numbers and calling parting origination numbers, said plurality of electronic queues including multiple types of queues having differing message targeting precision levels;
   an interface unit which receives at least one of a personal identification number and an origination number from a calling party and retrieves and outputs to the calling party a promotional message indicated by the data contained in a one of said plurality of electronic queues having a highest targeting precision level as identified by queue identification number corresponding to the received at least one of the personal identification number and the origination number;
   wherein each of said plurality of electronic queues contains plural queue storage positions for storing plural data indicative of a respective plurality of promotional messages; and
   wherein said communications system further comprises means for replenishing said electronic queues when a number of electronic messages indicated by the data stored therein falls below a preset queue level.

27. A telecommunications system for delivering promotional messages to calling parties, comprising:
   a local message bank having a plurality of electronic queues for storing data indicative of promotional messages therein and identifiable by queue identification numbers, each of the queue identification numbers corresponding at least one of calling party personal identification numbers and calling parting origination numbers, said plurality of electronic queues including multiple types of queues having differing message targeting precision levels;
   an interface unit which receives at least one of a personal identification number and an origination number from a calling party and retrieves and outputs to the calling party a promotional message indicated by the data contained in a one of said plurality of electronic queues having a highest targeting precision level as identified by queue identification number corresponding to the received at least one of the personal identification number and the origination number;
   wherein each of said plurality of electronic queues contains plural queue storage positions for storing plural data indicative of a respective plurality of promotional messages;
   wherein said communications system further comprises means for presorting the plural data according to coding logic received from the external source, wherein said plural data are retrieved from the queue storage positions based on an order resulting from said presorting; and
   wherein said communications system further comprises means for replenishing said electronic queues when a number of electronic messages indicated by the data stored therein falls below a preset queue level.

28. A communications system for delivering promotional messages to calling parties, comprising:
   a local message bank which stores the promotional messages at respective message bank addresses thereof;

a message queue having a plurality of electronic queues, each of said electronic queues identifiable by a unique queue identification number and for storing data indicative of a plurality of message bank addresses of a respective plurality of promotional messages stored in said message bank, at least some of said queue identification numbers corresponding to respective calling party personal identification numbers;

an interface unit which receives a personal identification number input by a calling party to obtain a corresponding queue identification number, and which retrieves and outputs to the calling party a promotional message stored in the message bank at a message bank address indicated by the data contained in a one of said plurality of electronic queues identified by the corresponding queue identification number; and a control facility for associating the promotional messages with subscribed calling parties off-line from the message queue, and for downloading data indicative of the associations to the message queue for storage as the data indicative of the plurality of message bank addresses in designated ones of said electronic queues.

29. A communications system as claimed in claim 28, further comprising a control server which relays information back and forth between said interface unit and an external telephone switching unit, the external telephone switching unit connecting the calling and called parties.

30. A communications system as claimed in claim 28, further comprising a distribution module which receives and stores data indicative of promotional messages from an external source, and which inserts the data indicative of promotional messages in designated ones of said electronic queues.

31. A communications system as claimed in claim 28, wherein at least a subset of said plurality of electronic queues are respectively addressed by unique queue identification numbers corresponding to respectively unique calling party personal identification numbers.

32. A communications system for delivering promotional messages to calling parties, comprising:

a local message bank having a plurality of electronic queues for storing data indicative of promotional messages therein and identifiable by queue identification numbers, at least some of said queue identification numbers corresponding to respective calling party personal identification numbers;

an interface unit which receives a personal identification number from a calling party and retrieves and outputs to the calling party a promotional message indicated by the data contained in a one of said plurality of electronic queues identified by the queue identification number corresponding to the received personal identification number; and a control facility for associating the promotional messages with subscribed calling parties off-line from the local message bank, and for downloading data indicative of the associations to the local message bank for storage of corresponding data in designated ones of said electronic queues;

wherein each of said plurality of electronic queues contains plural queue storage positions for storing plural data indicative of a respective plurality of promotional messages, and wherein said system further comprising means for initiating a message replenishment routine for replenishing said electronic queues when a number of promotional messages indicated by the data stored therein falls below a preset queue level.

33. A communications system as claimed in claim 32, further comprising means for executing a forward replenishment routine in which said control facility initiates off-line downloading of data indicative of promotional messages from said control facility to said local message bank, and for executing a reverse replenishment routine in which said local message bank accesses said control facility for off-line downloading of data indicative of promotional messages when a number of promotional messages indicated by the data stored therein falls below a preset queue level.

34. A communications system for delivering promotional messages to calling parties, comprising:

a local message bank having a plurality of electronic queues for storing data indicative of promotional messages therein and identifiable by queue identification numbers, at least some of said queue identification numbers corresponding to respective calling party personal identification numbers;

an interface unit which receives a personal identification number from a calling party and retrieves and outputs to the calling party a promotional message indicated by the data contained in a one of said plurality of electronic queues identified by the queue identification number corresponding to the received personal identification number; and a control facility for associating the promotional messages with subscribed calling parties off-line from the local message bank, and for downloading data indicative of the associations to the local message bank for storage of corresponding data in designated ones of said electronic queues;

wherein said control facility comprises means for bundling the data indicative of promotional messages within respective message data modules to be downloaded to said local message bank, each of said message data modules including at least an address associated with the local message bank, the queue identification numbers for a corresponding promotional message, delivery parameters of the corresponding promotional message, and data specifying the promotional message.

35. A communications system as claimed in claim 34, wherein said delivery parameters are coded to specify at least a delivery timing and frequency of each corresponding promotional message.

36. A communications system as claimed in claim 35, further comprising a warehouse module for storing said message data modules prior to downloading to said local message bank.

37. A communications system as claimed in claim 36, wherein said control facility further comprises means for updating message data modules stored in said warehouse module prior to downloading to said local message bank.

38. A communications system for delivering promotional messages to calling parties, comprising:

a local message bank having a plurality of electronic queues for storing data indicative of promotional messages therein and identifiable by queue identification numbers, at least some of said queue identification numbers corresponding to respective calling party personal identification numbers;

an interface unit which receives a personal identification number from a calling party and retrieves and outputs to the calling party a promotional message indicated by the data contained in a one of said plurality of electronic queues identified by the queue identification number corresponding to the received personal identification number; and a control facility for associating the promotional messages with subscribed calling parties off-line from the local message bank, and for downloading data indicative of the associations to the local message bank for storage of corresponding data in designated ones of said electronic queues;

wherein said plurality of electronic queues of said local message bank include multiple types of queues having differing message targeting precision levels, and wherein said interface unit outputs to the calling party a promotional message indicated by the data contained in a one of said plurality of electronic queues having a highest targeting precision level as identified by the queue identification number corresponding to the received personal identification number.

39. A communications system for delivering promotional messages to calling parties, comprising:

a local message bank having a plurality of electronic queues for storing data indicative of promotional messages therein and identifiable by queue identification numbers, at least some of said queue identification numbers corresponding to respective calling party personal identification numbers;

an interface unit which receives a personal identification number from a calling party and retrieves and outputs to the calling party a promotional message indicated by the data contained in a one of said plurality of electronic queues identified by the queue identification number corresponding to the received personal identification number; and a control facility for associating the promotional messages with subscribed calling parties off-line from the local message bank, and for downloading data indicative of the associations to the local message bank for storage of corresponding data in designated ones of said electronic queues;

wherein said multiple queue types include individual queues provided for each subscribed calling party which are each identified by a respectively unique queue identification number corresponding to a unique calling party identification number, and group queues provided for groups of subscribed calling parties which are identified by respective group queue identification numbers, wherein the individual queues have a higher message targeting precision than the group queues.

40. A communications system as claimed in claim 39, wherein said group queues include at least one of categorized queues, geographic queues, usage queues and a general queue, each of said categorized queues associated with groups of subscribed calling parties having overlapping targeting parameters, each of said geographic queues associated with groups of subscribed calling parties of predetermined geographic areas, each of said usage queues associated with differing level of calling party usage, and said general queue associated with all or a random subset of the subscribed calling parties.

41. A method for delivering promotional messages to subscribed calling parties, comprising:

storing the promotional addresses in a message bank at respective message bank addresses thereof;

comparing preset targeting criteria of each promotional message with profile data of each subscribed calling party to obtain data associating each of the promotional messages with at least one subscribed calling party;

storing data indicative of the message bank addresses of each of the promotional messages associated with at least one subscribed calling party in a message queue having a plurality of electronic queues, each of said electronic queues assigned to at least one subscribed calling party; and, accessing an electronic queue assigned to a calling party, and retrieving and delivering to the calling party a promotional message stored in said message bank at a message bank address indicated by the data contained in the accessed electronic queue.

42. A method for delivering promotional messages to calling in a communications system, comprising:

storing the promotional messages in a message bank at respective message bank addresses thereof;

storing data indicative of the message bank addresses of each of a plurality of promotional messages in each of a plurality of electronic queues which are addressed by queue identification numbers, each of the queue identification numbers corresponding to at least one of a plurality of calling party identification numbers;

processing a call by receiving an identification number of a calling party and retrieving and outputting to the calling party a promotional message stored in said message bank at a message bank address indicated by the data contained in a one of said plurality of electronic queues identified by the queue identification number corresponding to the received identification number; and assembling and downloading the data indicative of the plurality of memory bank addresses for storage in designated ones of said electronic queues;

wherein said assembling and downloading of the data indicative of the plurality of memory bank addresses are carried out off-line of said processing of the call.

43. A method as claimed in claim 42, wherein the identification number is a personal identification number input by the calling party.

44. A method as claimed in claim 43, wherein the personal identification number is embedded with coding logic pointing to one of the electronic queues.

45. A method as claimed in claim 42, wherein the identification number is an originating number of the calling party.

46. A method for delivering promotional messages to calling parties in a telecommunications system, comprising:

storing data indicative of promotional messages in a plurality of electronic queues which are addressed by queue identification numbers, each of the queue identification numbers corresponding to at least on calling party identification numbers;

processing a call by receiving an identification number of a calling party and retrieving and outputting to the calling party a promotional message indicated by the data contained in a one of said plurality of electronic queues identified by the queue identification number corresponding to the received identification number; and assembling and downloading the data indicative of promotional messages for storage in designated ones of said electronic queues;

wherein said assembling and downloading of the promotional message are carried out off-line of said processing of the call;

wherein said plurality of electronic queues include multiple types of queues having differing message targeting precision levels, and wherein said processing of the call includes outputting to the calling party a promotional message indicated by the data contained in a one of said plurality of electronic queues having a highest targeting precision level as identified by queue identification number corresponding to the received identification number.

47. A method for delivering promotional messages to calling parties in a telecommunications system, comprising:

storing data indicative of promotional messages in a plurality of electronic queues which are addressed by queue identification numbers, each of the queue identification numbers corresponding to at least on calling party identification numbers;

processing a call by receiving an identification number of a calling party and retrieving and outputting to the calling party a promotional message indicated by the data contained in a one of said plurality of electronic queues identified by the queue identification number corresponding to the received identification number; and assembling and downloading the data indicative of promotional messages for storage in designated ones of said electronic queues;

wherein said assembling and downloading of the promotional message are carried out off-line of said processing of the call;

wherein said assembling of the promotional messages includes bundling the data indicative of promotional messages within respective message data modules to be downloaded to said plurality of electronic queues, each of said message data modules including at least an address associated with the local message bank, the queue identification numbers for a corresponding promotional message, delivery parameters of the corresponding promotional message, and data specifying the corresponding promotional message.

48. A method as claimed in claim 47, wherein said delivery parameters are coded to specify at least a delivery timing and frequency of each corresponding promotional message.

49. A method as claimed in claim 48, further comprising storing said message data modules in a warehouse module prior to downloading to said plurality of electronic queues.

50. A method as claimed in claim 49, further comprising updating message data modules stored in said warehouse module prior to downloading to said plurality of electronic queues.

51. A method for delivering promotional messages to calling parties in a telecommunications system, comprising:

storing data indicative of promotional messages in a plurality of electronic queues which are addressed by queue identification numbers, each of the queue identification numbers corresponding to at least on calling party identification numbers;

processing a call by receiving an identification number of a calling party and retrieving and outputting to the calling party a promotional message indicated by the data contained in a one of said plurality of electronic queues identified by the queue identification number corresponding to the received identification number; and assembling and downloading the data indicative of promotional messages for storage in designated ones of said electronic queues;

wherein said assembling and downloading of the promotional message are carried out off-line of said processing of the call;

wherein each of said plurality of electronic queues contains plural queue storage positions for storing plural data indicative of a plurality of promotional messages, and wherein said method further comprises executing a message replenishment routine for replenishing said electronic queues when a number of electronic messages indicated by the data stored therein falls below a preset queue level.

52. A method for delivering promotional messages to calling parties in a communications system, comprising:

storing the promotional messages in a message bank at respective message bank addresses thereof;

associating each individual calling party with a plurality of promotional messages;

assigning each individual calling party a unique queue identification number;

assembling and storing message data modules at a control module, each of said message data modules including at least data indicative of a message bank address of a promotional message, at least one queue identification number of a calling party associated with the promotional message, and delivery parameters associated with the promotional message;

downloading the message data modules to a distribution module;

transferring from the distribution module at least the data indicative of the message bank address of each message data module to at least one of plural electronic queues addressed by the at least one queue identification number associated with the promotional message; and processing a call by receiving an identification number from a calling party to obtain a corresponding queue identification number, and retrieving and outputting to the calling party a promotional message stored in the memory bank at a memory bank address indicated by the data contained in a one of said plural electronic queues identified by the corresponding queue identification number.

53. A method as claimed in claim 52, wherein the identification number is a personal identification number input by the calling party.

54. A method as claimed in claim 53, wherein the personal identification number is embedded with coding logic pointing to one of the electronic queues.

55. A method as claimed in claim 52, wherein the identification number is an originating number of the calling party.

56. A method as claimed in claim 55, wherein said delivery parameters are coded to specify at least a delivery timing and frequency of each corresponding promotional message.

57. A method as claimed in claim 55, further comprising storing said message data modules in a warehouse module of said control module prior to downloading to said distribution module.

58. A method as claimed in claim 57, further comprising updating message data modules stored in said warehouse module prior to downloading to said distribution module.

59. A method for delivering promotional messages to calling parties in a telecommunications system, comprsing:

assembling and storing message data modules at a control module, each of said message data modules including at least data indicative of a promotional message, at least one queue identification number associated with the promotional message, and delivery parameters associated with the promotional message;

downloading the message data modules to a distribution module;

transferring from the distribution module at least the data indicative of the promotional message of each message data module to at least one of plural electronic queues addressed by the at least one queue identification number associated with the promotional message; and processing a call by receiving an identification number from a calling party and retrieving and outputting to the calling party a promotional message indicated by the data contained in a one of said plural electronic queues identified by a queue identification number corresponding to the received identification number;

wherein the identification number is an originating number of the calling party; and wherein said plurality of electronic queues include multiple types of queues having differing message targeting precision levels, and wherein said processing of the call includes outputting to the calling and called parties a promotional message indicated by the data contained in a one of said plurality of electronic queues having a highest targeting precision level as identified by queue identification number correspond to the received personal identification number.

* * * * *